(12) United States Patent  
Sato et al.

(10) Patent No.: US 8,169,500 B2  
(45) Date of Patent: May 1, 2012

(54) DYNAMIC RANGE COMPRESSION APPARATUS, DYNAMIC RANGE COMPRESSION METHOD, COMPUTER-READABLE RECORDING MEDIUM, INTEGRATED CIRCUIT, AND IMAGING APPARATUS

(75) Inventors: Daisuke Sato, Osaka (JP); Haruo Yamashita, Osaka (JP); Takeshi Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 12/475,958

(22) Filed: Jun. 1, 2009

(65) Prior Publication Data

US 2009/0295937 A1 Dec. 3, 2009

(30) Foreign Application Priority Data

May 30, 2008 (JP) ................................. 2008-142967

(51) Int. Cl.
*H04N 5/228* (2006.01)
*H04N 5/235* (2006.01)
*G06K 9/36* (2006.01)

(52) U.S. Cl. ................... 348/222.1; 348/229.1; 382/232

(58) Field of Classification Search .................. None
See application file for complete search history.

(56) References Cited

U.S. PATENT DOCUMENTS

| 6,873,729 | B2 * | 3/2005 | Matsushima | 382/167 |
| 7,860,339 | B2 * | 12/2010 | Yamashita et al. | 382/274 |
| 2006/0114333 | A1 * | 6/2006 | Gokturk et al. | 348/222.1 |
| 2007/0109447 | A1 * | 5/2007 | Yamashita et al. | 348/602 |

FOREIGN PATENT DOCUMENTS

| EP | 1 959 390 | 8/2008 |
| JP | 2006-24176 | 1/2006 |
| JP | 4126297 | 7/2008 |
| WO | 2007/043460 | 4/2007 |

* cited by examiner

*Primary Examiner* — Luong T Nguyen

(74) *Attorney, Agent, or Firm* — Wenderoth, Lind & Ponack, L.L.P.

(57) ABSTRACT

A dynamic range (D-range) compression apparatus that uses a look-up table (LUT) is capable of dynamic compression that compresses the peak input value to the full output range, even when image signals with variable D-ranges are inputted. According to this D-range compression apparatus, D-range compression processing that places the D-range of the image signal within a predetermined output D-range is performed by the visual processing unit converting the tone of the image signal in accordance with the surrounding average luminance signal. Furthermore, with this D-range compression apparatus, the image signal is amplified in accordance with amplification input/output conversion characteristics determined based on the peak value in the image detected by the peak detection unit, and therefore it is possible to perform a dynamic amplification processing in accordance with the peak value so that the D-range of the image signal outputted from the visual processing unit becomes a predetermined output D-range.

25 Claims, 17 Drawing Sheets

Second Embodiment

Brightness Contrast Characteristics
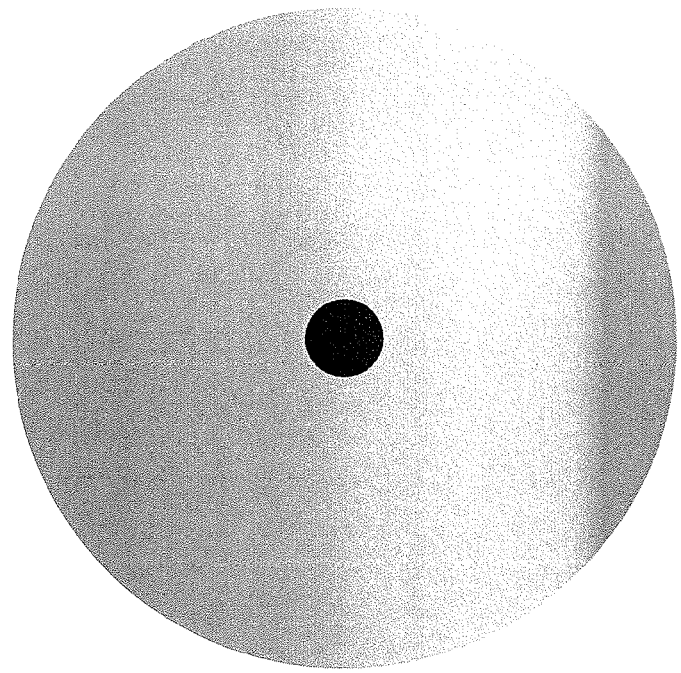
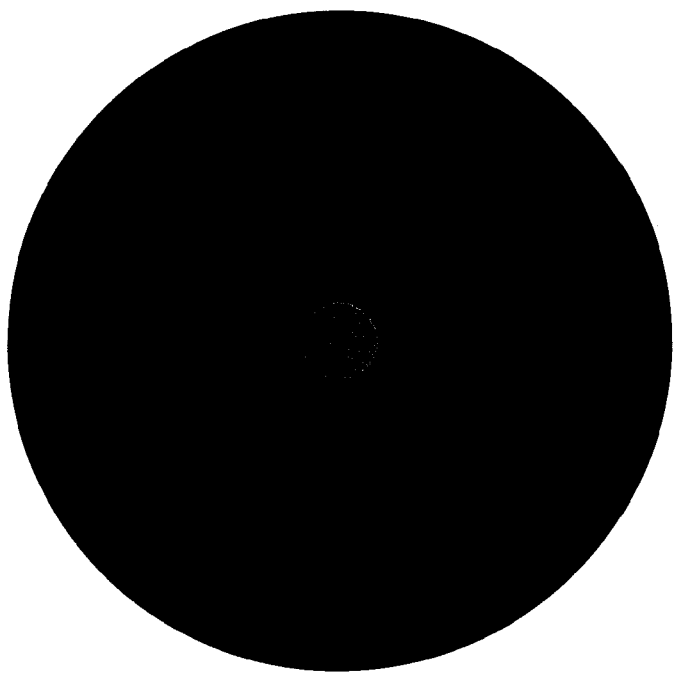
FIG. 2

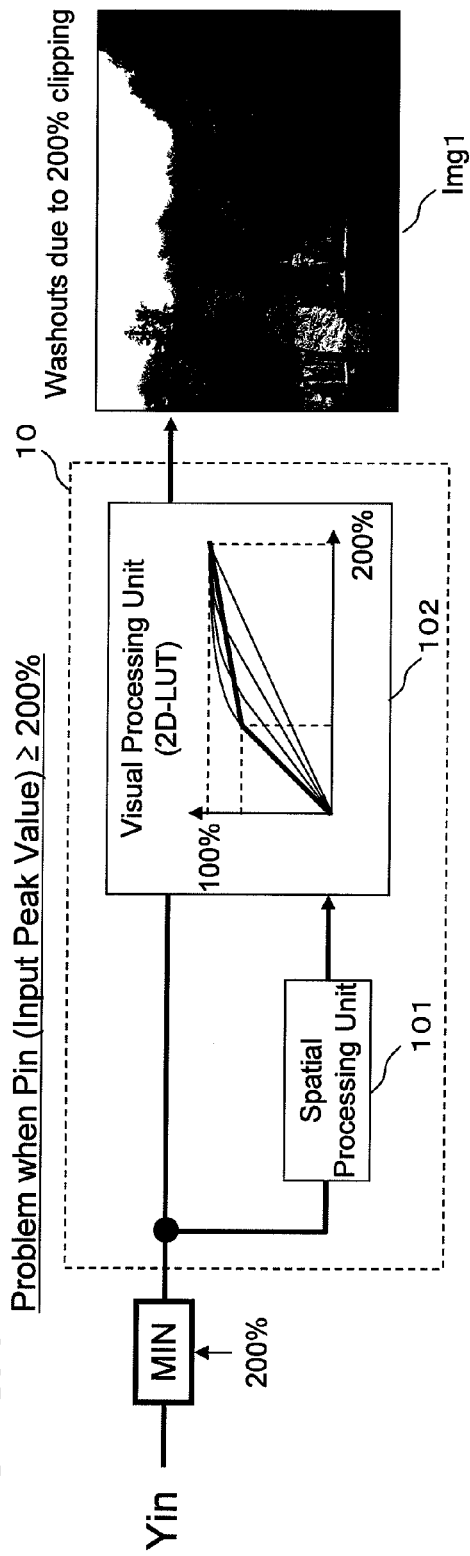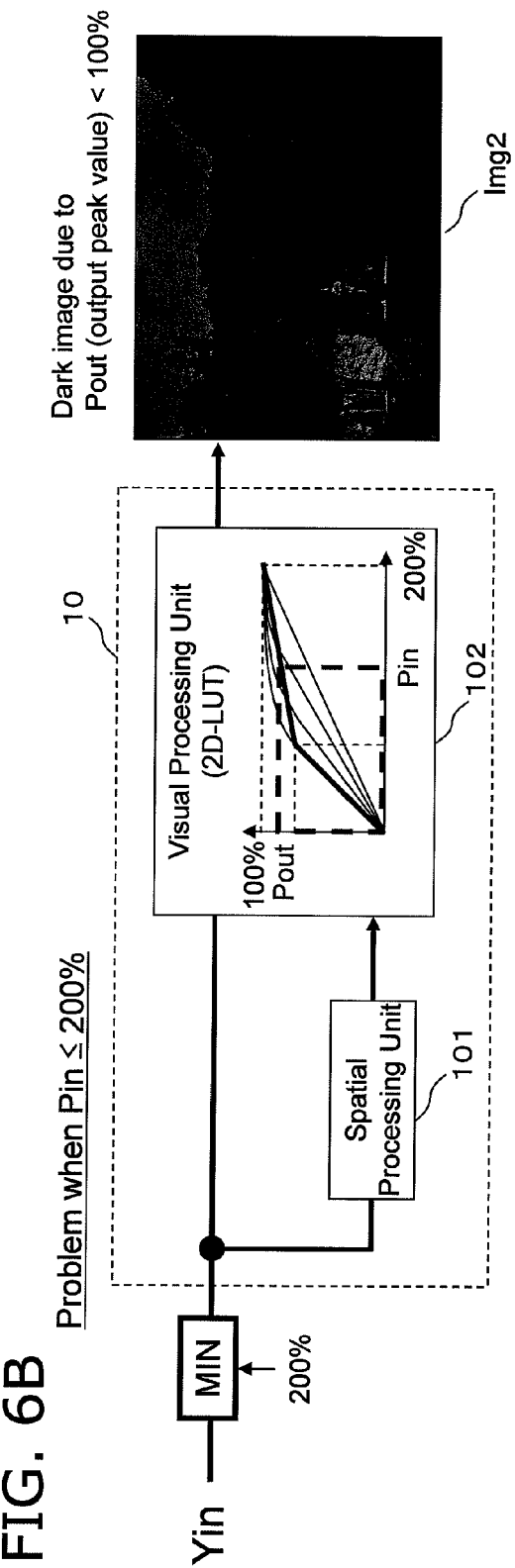
FIG. 6A Problem when Pin (Input Peak Value) ≥ 200%
FIG. 6B Problem when Pin ≤ 200%

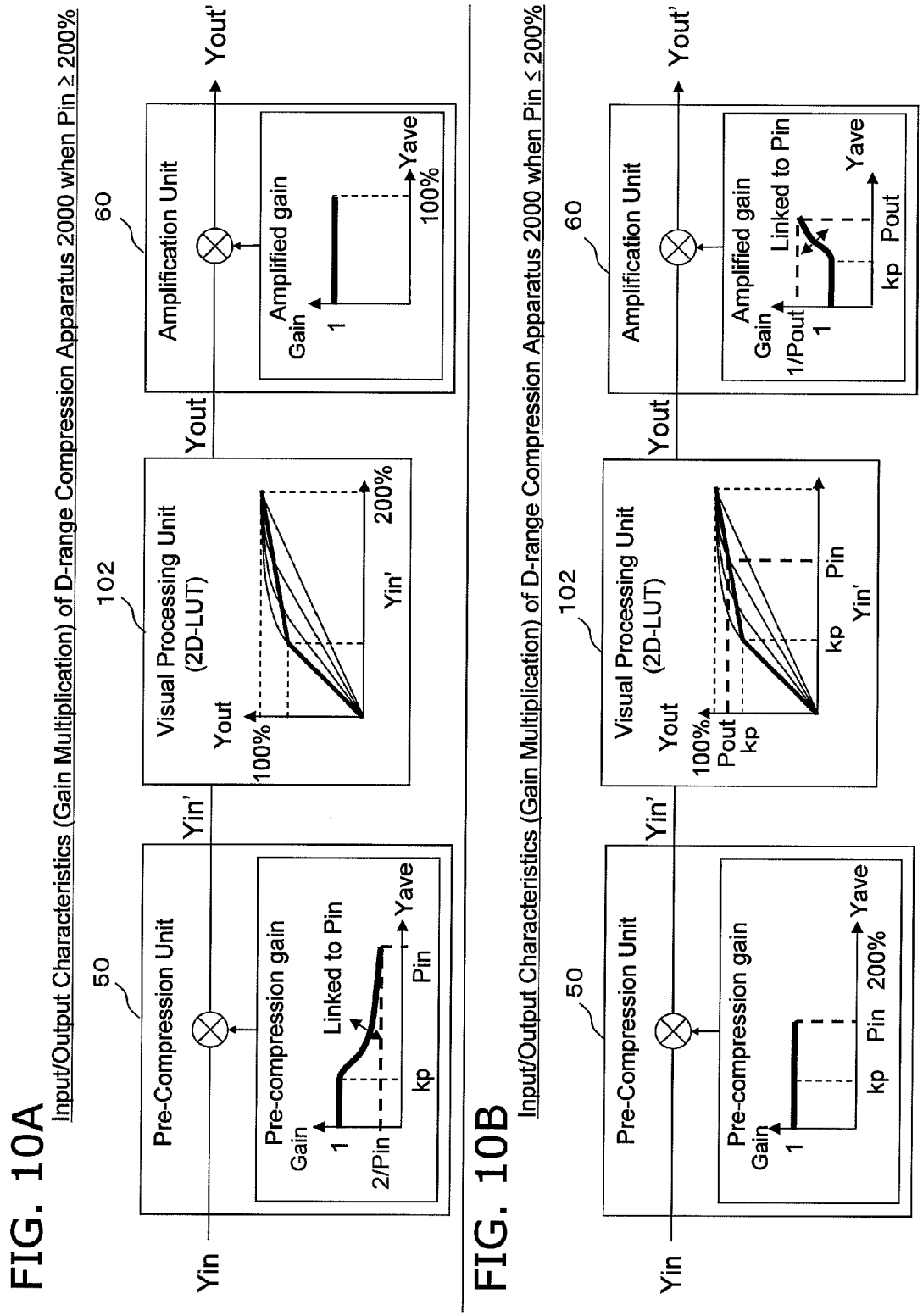

Input/Output Characteristics (Gain Broken Line Approximation) of D-range Compression Apparatus 2000 when Pin ≥ 200%

Input/Output Characteristics (Gain Broken Line Approximation) of D-range Compression Apparatus 2000 when Pin ≤ 200%

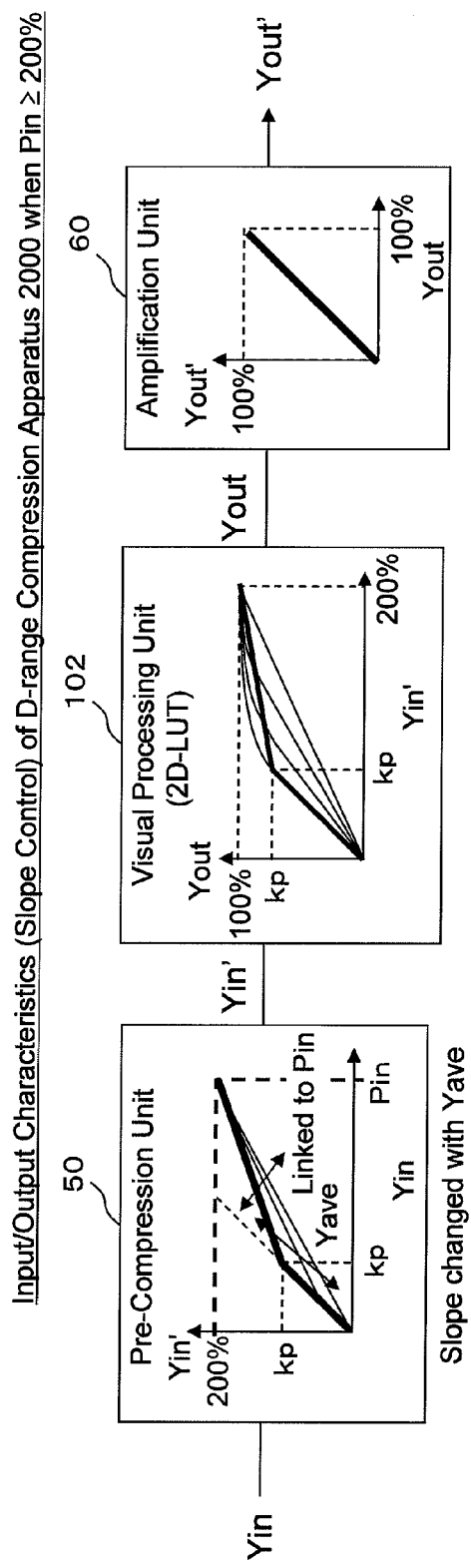
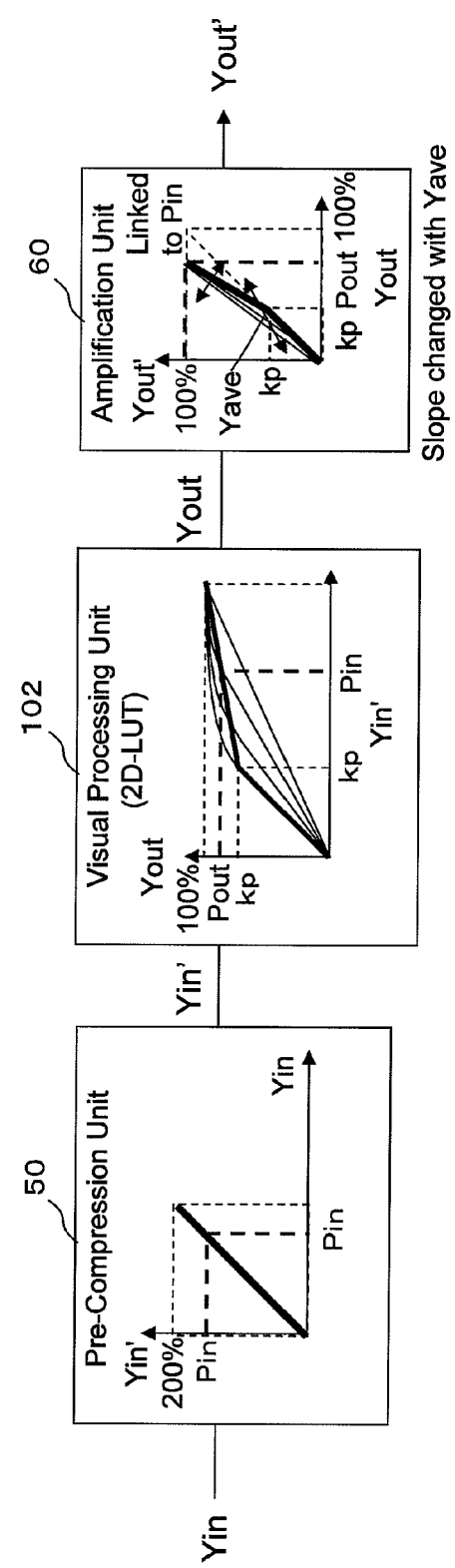
FIG. 12A
FIG. 12B

DYNAMIC RANGE COMPRESSION APPARATUS, DYNAMIC RANGE COMPRESSION METHOD, COMPUTER-READABLE RECORDING MEDIUM, INTEGRATED CIRCUIT, AND IMAGING APPARATUS

This application claims priority to Japanese Patent Application No 2008-142967 filed on May 30, 2008, the entire disclosure of which is hereby incorporated herein by reference.

BACKGROUND OF THE INVENTION

1. Field of the Invention

The present invention relates to a dynamic range compression apparatus, a dynamic range compression method, a program, an integrated circuit, and an imaging apparatus, and particularly relates to a dynamic range compression apparatus, dynamic range compression method, program, integrated circuit, and imaging apparatus in which an image signal with a variable dynamic range is inputted.

2. Description of the Related Art

Imaging apparatuses, such as digital cameras that shoot still images and digital video cameras that shoot videos, use an optical system to control exposure, and use a CCD image sensor, a CMOS image sensor, or the like to convert the image formed by the optical system into an electrical signal through photoelectric conversion and obtain an analog image signal. Conventional imaging apparatuses process the obtained analog image signal using a circuit that performs analog front-end processing and the like, and convert the signal into digital image data through an A/D converter. This digital image data processed through gamma correction processing for video (for example, gamma correction processing where $\gamma=0.45$), knee processing, luminance/color difference conversion processing, and so on, is converted into a standardized format such as JPEG (Joint Photographic Experts Group) or the like, in the case of still image data, or MPEG (Moving Picture Experts Group), DV (Digital Video), or the like, in the case of video data. Having been converted into such a standardized format, the digital image data is recorded into various types of memory cards, hard disks, optical disks, magnetic tape, or the like.

Assuming the whitest point (in other words, the maximum brightness value when the image is displayed in a display device) set in the abovementioned standardized formats (image (video) formats) is 100%, a dynamic range (also called "D-range") of 100% to 500% brightness is normally set for shooting in such a conventional imaging apparatus. Note that "a dynamic range of 100%" indicates that the range a signal value (for example, the brightness value) can take on is from 0% to 100%. In other words, "a dynamic range of 100%" means that the minimum signal value is 0% and the maximum signal value is 100%. Furthermore, the image sensor of the imaging apparatus is assumed to have a sensitivity (photosensitivity) capable of sufficiently handling the change in light intensity corresponding to a video (image) signal whose dynamic range is to be approximately 200% to 500% if photoelectric conversion is performed. The image sensor of the imaging apparatus is assumed, for example, to have a sensitivity (photosensitivity) sufficient for light converted into a high-luminance signal, such as with an image of the sky, clouds, or the like.

Users generally use such imaging apparatuses to shoot a variety of scenes, from somewhat dark indoor night shots to outdoor shots on clear days. Different peak values appear in the video (image) signals obtained by the image sensor of the imaging apparatus depending on the scene shot with the imaging apparatus. In other words, different peak values appear in the pixel values (the values of the pixels that form the image (values corresponding to the video (image) signal values)) within a single image (for example, the image in a single frame) formed by the video (image) signal obtained by the image sensor. For example, when a somewhat dark indoor night scene is shot using the imaging apparatus, the peak value of the pixel values in the captured image (the image obtained by the image sensor of the imaging apparatus) is low, whereas when an outdoor scene is shot on a clear day using the imaging apparatus, the peak value of the pixel values in the captured image is high. Video (image) signals obtained by the image sensor of the imaging apparatus, in which the peak values differ depending on the scene that was shot, are inputted into a signal processing unit in the imaging apparatus, located subsequent to the image sensor. That is, a video (image) signal with a variable D-range is inputted into the signal processing unit of the imaging apparatus.

The imaging apparatus uses the signal processing unit to compress video (image) signals with such variable and wide D-ranges into video (image) signals with a D-range of 100% or less, and output the resulting signals to a display device or record the signals in a recording medium. This type of compression processing, performed by an imaging apparatus, is called "D-range compression processing". It should be noted that the imaging apparatus normally performs $\gamma$ correction (for example, gamma correction processing where $\gamma=0.45$) prior to the D-range compression processing, and thus a video (image) signal with a D-range of, for example, 500% is converted into a video (image) signal with a D-range of approximately 200% through the $\gamma$ processing where $\gamma=0.45$. Hereinafter, "D-range X %" (where X is an arbitrary number), or simply "X %" (where X is an arbitrary number) refers to the D-range of the video (image) signal following the $\gamma$ correction processing.

Two types of conventional D-range compression processing, or the well-known auto knee processing and D-range compression processing performed by a visual processing apparatus as disclosed in Patent Documents 1 (JP 4126297B) and 2 (WO 2007/043460), will be described next.

<Auto Knee Processing>

FIG. 1 illustrates the input/output characteristics of auto knee processing.

Auto knee processing compresses the input D-range of input luminance signals Yin representing the luminance of each pixel in an input image (signals corresponding to the pixel values of each pixel in the input image) using a compression having input/output characteristics with a broken line form such as that shown in FIG. 1, and outputs output luminance signals Yout.

As shown in FIG. 1, the input/output characteristics of this broken line form include a low-luminance conversion portion LR (slope 1) (in the graph in FIG. 1, the region where Yin is 0% to 85% corresponds to this low-luminance conversion portion) and a high-luminance conversion portion HR (knee slope, or slope variance) (in the graph in FIG. 1, the region where Yin is greater than or equal to 85% corresponds to this high-luminance conversion portion HR), with a knee point (normally at approximately 85%) therebetween. Auto knee processing generally changes the slope of the high-luminance conversion portion HR in accordance with the peak input value so that the peak input value that varies depending on the shot scene (the peak value of the input luminance signal Yin) is always outputted as the maximum value of the D-range in the output luminance signal Yout. For example, when, as shown in FIG. 1, the peak input value Pin is A1, the characteristic curve (a straight line, in FIG. 1) of the high-luminance conversion portion HR in the input/output characteristics of the D-range compression processing is taken as the straight line L1. When the peak input value Pin is A2, the characteristic curve (a straight line, in FIG. 1) of the high-luminance conversion portion HR in the input/output characteristics of the D-range compression processing is taken as the straight line L2. Finally, when the peak input value Pin is A3, the characteristic curve (a straight line, in FIG. 1) of the high-luminance conversion portion HR in the input/output characteristics of the D-range compression processing is taken as the straight line L3. In this manner, auto knee processing changes the slope of the high-luminance conversion portion HR in accordance with the peak input value Pin.

With auto knee processing, an input luminance signal Yin of a medium-to-low luminance (0% to 85%), in which main subjects such as people exist, is converted by the characteristic curve (a straight line, in FIG. 1) of the low-luminance conversion portion LR (slope 1) into an output luminance signal Yout of a consistent brightness.

However, a high-luminance signal (85% to the peak input value) corresponding to regions such as the sky and clouds in a subject is compressed by the high-luminance conversion portion HR (less than the slope 1) so that the D-range of the output luminance signal falls within a range of 15%, from 85% to 100%, which leads to a marked degradation in the tone of the image formed by the output luminance signal. For this reason, there is a problem in that the contrast of the sky, clouds, and so on in an image formed by a luminance signal on which auto knee processing has been performed will drop considerably, as shown in FIG. 5A.

<D-Range Compression Processing by Visual Processing Apparatus Disclosed in Patent Documents 1 and 2 (Visual Knee Processing)>

D-range compression processing based on the visual characteristics of humans has therefore been disclosed, as in Patent Documents 1 and 2, in order to solve the problem of drops in contrast. This will be described using FIGS. 2 to 4.

First, FIG. 2 is a diagram illustrating the brightness contrast characteristic, which is one of the stated visual characteristics.

The small circles located within the large circles on the left and right are both of the same brightness, but the small circle in the center of the large circle on the left appears brighter because its surroundings are dark, whereas the small circle in the center of the large circle on the right appears darker because its surroundings are bright. Humans thus sense brightness and contrast based on an object's surroundings, rather than sensing brightness directly. This is called the brightness contrast characteristic.

Next, a visual processing apparatus 10 that performs a tone conversion process based on this brightness contrast characteristic, as disclosed in Patent Documents 1 and 2, will be described.

FIG. 3 is a block diagram illustrating the visual processing apparatus 10. The visual processing apparatus 10 is configured of a spatial processing unit 101 and a visual processing unit 102 achieved using a two-dimensional LUT.

First, the spatial processing unit 101 calculates a surrounding average luminance (signal) Yave for the input luminance (signal) Yin.

Here, "surrounding average luminance" refers to the average luminance value of pixels present in an image region of a predetermined area formed with a pixel of interest, which is the target of the processing, at its center, in an image formed by the input luminance signal Yin; for example, when the image size is 1920×1080 pixels, the average luminance value of pixels present in a region (image region) of approximately 400×240 pixels with the pixel of interest at the center corresponds to this "surrounding average luminance".

Next, multiple tone conversion curves (tone conversion characteristic curve data that determines the tone conversion characteristics) that differ for each surrounding average luminance (signal) Yave are stored in the visual processing unit 102, and the input luminance (signal) Yin undergoes tone conversion using the tone conversion curve that corresponds to that surrounding average luminance (signal) Yave based on a 2D-LUT (two-dimensional look-up table). The visual processing unit 102 then outputs the output luminance (signal) Yout obtained as a result of the tone conversion.

Making various changes to the input/output characteristics of the visual processing unit 102 (when the visual processing unit 102 is achieved using a 2D-LUT (two-dimensional look-up table), making various changes to the input/output characteristics data of that 2D-LUT) makes it possible for the visual processing apparatus 10 to perform D-range compression processing, dark region correction processing, and so on while maintaining the contrast, as well as various tone conversion processes, such as contrast enhancement processing that maintains the overall sense of brightness.

The case where the visual processing unit 102 is used in the D-range compression processing will now be described in detail. The D-range compression processing performed by the visual processing unit 102 is hereinafter called "visual knee processing", referring to knee processing that is based on visual characteristics.

FIG. 4 illustrates the input/output characteristics of a visual processing unit 11 during visual knee processing.

In visual knee processing, the D-range of the input luminance (signal) Yin is compressed, based on the brightness contrast characteristic, using a tone conversion curve (selected from tone conversion curves C1 to Cn) that converts the tone of the input luminance signal Yin to a lower value the higher Yave is, and the output luminance (signal) Yout is outputted. Here, the tone conversion curve C1 represents a D-range compression curve selected when the surrounding average luminance Yave is less than 85%, whereas a tone conversion curve C2, a tone conversion curve Cm, and a tone conversion curve Cn represent D-range compression characteristic curves (tone conversion curves), where lower curves in the graph in FIG. 4 are selected the higher the surrounding average luminance Yave is. This visual knee processing will be compared to the auto knee processing using FIG. 5.

FIG. 5A is a diagram illustrating an image processed using auto knee processing. FIG. 5B, meanwhile, is a diagram illustrating an image processed using visual knee processing.

With auto knee processing, the input luminance (signal) Yin is processed using a single type of curve (broken line) (the broken line AK, in FIG. 4) (tone conversion curve), and the output luminance (signal) Yout is obtained. In other words, with auto knee processing, the entire input image (the entire image shown in FIG. 5A) is processed using a single type of tone conversion curve (broken line). In auto knee processing, higher luminance values (signal values) in the input luminance (signal) Yin (high-luminance signals) are more strongly compressed in order to maintain a sufficient brightness in the image formed by the output luminance signal Yout following the auto knee processing, with respect to image regions of a medium-to-low brightness in the image formed by the input luminance (signal) Yin, such as regions where people are present. Accordingly, as shown in FIG. 5A, the contrast drops in the sky portion of the image, which is an image region formed by high-luminance signals.

However, with visual knee processing, tone conversion processing is performed using different tone conversion curves depending on whether the image region is a bright region or a dark region according to the surrounding average luminance, as shown in FIG. 5B. In other words, with visual knee processing, different tone conversion curves are selected for each brightness region in the image. Portions (image regions) containing main subjects, such as people, that have medium-to-low luminance undergo tone conversion using the tone conversion curve C1. Through this, the post-visual knee processing image maintains the brightness of the portions (image regions) containing main subjects, such as people, that have medium-to-low luminance. Meanwhile, image region formed by high-luminance signals, such as the sky, clouds, and so on, have a high surrounding average luminance, and therefore undergo tone conversion using, for example, the tone conversion curve Cm. In most of the regions in which the value of the input luminance signal Yin is high (that is, regions where Yin in FIG. 4 is 85% to 200%), the tone conversion curve Cm has a slope greater than that of the curve (in FIG. 4, a line) in the high-luminance conversion portion of the tone conversion curve used in the auto knee processing, and has a low post-tone conversion value (Yout value) (output value). For this reason, a high-luminance signal that has been inputted (for example, an input luminance signal Yin of 85% to 200%) is compressed to an output luminance signal Yout with a wider output D-range (for example, 50% to 100%). This suppresses a drop in contrast in images obtained through the visual knee processing.

For example, in visual knee processing, when the input luminance signal Yin of a pixel of interest is B1 and the luminance surrounding that pixel of interest is high, the input luminance signal Yin corresponding to that pixel of interest is converted into an output luminance signal Yout value D1 based on the tone conversion curve Cm. Meanwhile, in auto knee processing, assuming the same conditions, the input luminance signal Yin corresponding to the pixel of interest (that is, B1) is converted to an output luminance signal Yout value E1 based on the tone conversion curve AK represented by the broken line. In other words, in this case, the value obtained through conversion by the visual knee processing (the value of Yout) is smaller, and thus the visual knee processing can obtain an output luminance signal Yout with a wider output D-range than can be obtained through the auto knee processing. In addition, the slope of the tone conversion curve Cm in the portion indicated by R2 in FIG. 4 is greater than the slope of the broken line AK in the portion indicated by R1 in FIG. 4. For this reason, drops in contrast will be suppressed more in images obtained through the visual knee processing than in images obtained through the auto knee processing.

Thus, visual knee processing does not perform D-range compression processing (tone conversion processing) on the entire image using a single D-range compression curve (line) (tone conversion curve) as is the case with auto knee processing; rather, a predetermined output D-range compression curve (tone conversion curve) is selected from among multiple D-range compression curves (tone conversion curves) based on the surrounding average luminance of a pixel of interest, and D-range compression processing (tone conversion processing) is performed using that curve. For this reason, visual knee processing makes it possible to achieve D-range compression processing (tone conversion processing) that enables the independent control of brightness for each luminance region (image region) (for example, for each bright region, each dark region, and so on). In other words, with visual knee processing, it is possible to increase the slope of the tone conversion curve applied to high-luminance regions in which the surrounding average luminance is high while also maintaining the brightness of main subjects. This makes it possible to greatly improve the tone of high-luminance regions (high-luminance image regions) in images obtained through visual knee processing.

However, visual knee processing is a fixed process based on an LUT (look-up table), and does not have a function for linking the input/output characteristics with the peak input value as in auto knee processing (called an "auto knee function" hereinafter). This results in the following problems.

FIGS. 6A and 6B are diagrams illustrating problems that arise when there is no auto knee function.

These diagrams assume a maximum input D-range of 200% (post γ correction) for the 2D-LUT (two-dimensional look-up table) in the visual processing unit 102; FIGS. 6A and 6B illustrate operations performed by the visual processing apparatus 10 and the processed images in the case where the peak input value (peak value of the input luminance signal Yin) is greater than or equal to 200% and less than 200%, respectively.

(1) When the peak input value Pin≧200%, it is necessary to clip the input luminance (signal) Yin at 200% in advance, as shown in FIG. 6A. This means that any tones above 200% are lost, and thus there is a problem in that the sky portion (image region) are washed out, as shown in the processed image Img1 in FIG. 6A.

(2) However, when the peak input value Pin≦200%, the peak input value Pin of the input luminance (signal) Yin is converted using one of the tone conversion curves C1 to Cn, as shown in FIG. 6B. Regardless of which tone conversion curve is used, the output (output peak value) Pout obtained after the tone conversion performed by the visual processing unit 102 on the peak input value Pin is a value less than 100%, and thus the output D-range cannot be used in its entirety. In other words, in this case, the high-luminance signal (the input luminance signal Yin corresponding to the high-luminance image region) is compressed more than necessary, and thus the tone of high-luminance portions (for example, the sky portion in FIG. 6B) is lost in the image formed by the output luminance signal Yout outputted from the visual processing unit 102. For this reason, there is a problem in that the sky portions of the image are dark (resulting in what is called a "subdued image"), as shown in the processed image Img2 in FIG. 6B.

There is a conceivable method for solving these problems, where, for example, multiple LUTs with maximum input D-ranges (equivalent to the maximum D-range of the luminance signal Yin inputted into the visual processing unit 102) of 100%, 200%, 400%, 800%, and so on are created and the LUTs are switched dynamically in accordance with the peak input value Pin. However, in such a case, a two-dimensional LUT circuit for the 800% setting is necessary, leading to problems in that the circuit scale significantly increases in size, problems with time lag during the LUT switches, and so on, and thus employing this method is not realistic.

The present invention solves these problems, and it is an object thereof to provide a dynamic range compression apparatus, a dynamic range compression method, a program, an integrated circuit, and an imaging apparatus capable of consistently obtaining an image signal compressed at the full output range based on the peak value in an image formed by an input image signal (that is, capable of performing dynamic D-range compression processing in accordance with the peak value in the image), even in the case where an image signal with a variable D-range is inputted, by providing an auto knee function in visual knee processing.

It is a further object of the present invention to achieve an auto knee function that maintains contrast by controlling the gain using a surrounding average luminance signal.

SUMMARY OF THE INVENTION

A first aspect of the invention is a dynamic range (D-range) compression apparatus into which is inputted an image signal having a variable D-range, the apparatus including a spatial processing unit, a visual processing unit, a peak detection unit, and an amplification unit. The spatial processing unit calculates a surrounding average luminance signal for the image signal. The visual processing unit performs D-range compression processing so that the D-range of the image signal falls within a predetermined output D-range by converting the image signal based on tone conversion characteristics determined in accordance with the surrounding average luminance signal. The peak detection unit detects the peak value within an image formed by the image signal. The amplification unit performs dynamic amplification processing in accordance with the peak value so that the D-range of the image signal outputted by the visual processing unit becomes the predetermined output D-range by converting the image signal outputted by the visual processing unit based on amplification input/output conversion characteristics determined based on the peak value.

According to this D-range compression apparatus, D-range compression processing that places the D-range of the image signal within a predetermined output D-range is performed by the visual processing unit converting the tone of the image signal in accordance with the surrounding average luminance signal. Furthermore, with this D-range compression apparatus, the image signal is amplified in accordance with amplification input/output conversion characteristics determined based on the peak value in the image detected by the peak detection unit.

The visual processing unit is normally configured of a look-up table (LUT) so as to enable non-linear conversion as well. For this reason, it is not capable of dynamic processing, and cannot implement a function for linking knee characteristics (D-range compression characteristics) with the peak input value (an auto knee function). Accordingly, an amplification circuit (amplification unit) that uses the peak input value is provided in a later stage.

This makes it possible to perform dynamic amplification processing in accordance with the peak value, so that the D-range of the image signal outputted from the visual processing unit is a predetermined output D-range. Accordingly, images formed by image signals processed by the D-range compression apparatus are always images that have the full output range. Note that this D-range compression apparatus is not limited to an LUT, and can easily achieve the auto knee function even in the case where the non-linear conversion performed by the visual processing unit is implemented through a complex circuit (hardware).

Note that "surrounding average luminance signal" refers to information derived from a pixel of interest in the image formed by the image signal and the pixels surrounding that pixel of interest. The average brightness (tone level, pixel value) or the like of an image region M pixels by N pixels centered around the pixel of interest is an example of this. The surrounding image region of the pixel of interest (the image region used to find the surrounding average luminance signal) is not limited to a rectangular region, and may be a circular region, an oval region, or the like; in addition, the average luminance value is a concept that includes simple average values, weighted average values, and so on. Moreover, the processing for obtaining the surrounding image information does not necessarily need to be performed at the pixel level (pixel unit); the surrounding image information may be obtained by performing processing at the block level (block unit), with blocks made up of multiple pixels.

Meanwhile, "predetermined output D-range" refers to the D-range of the signal outputted by the D-range compression apparatus, and is a concept that includes the full range of the output signal. The "full range of the output signal" here is a concept that refers to the maximum value determined by the image format in a display device, recording medium, or the like, but is not limited thereto, and also includes, for example, the values near that maximum value.

Here, the "image format" is a recording format generally used by cameras, such as JPEG BMP, TIFF, RAW, or the like. The "maximum value determined by the image format" is, for example, 255 for BMP (when R, G, and B are each 8-bit).

Finally, "peak value" refers to the maximum value of the pixel values (equivalent to the signal values of the image signal) present within the input image (width W by height H), and is a concept that includes not only the strict maximum value, but also the values near the maximum value.

A second aspect of the invention is the first aspect, in which the predetermined output D-range is approximately 90% to 100% in the case where the maximum value according to the image format is 100%.

The predetermined output D-range is usually set at 100%. In other words, the input D-range is compressed to 100% or less by the visual processing unit (configured of a 2D-LUT), and overcompression is amplified using the amplification unit, bringing the D-range up to 100% (which is the full output range, or the maximum value determined by the image format). However, the D-range does not necessarily need to be placed at exactly 100%; the value may be in the range of 90% to 100%.

Note that with video, there are cases where the maximum value determined by the image format, or 255, is set to 109%. This is so that 16 is taken as 0% and 235 is taken 100%, in which case 255 is approximately 109%; the predetermined output D-range includes this concept.

A third aspect of the invention is the first or second aspect of the invention, further including a pre-compression unit that performs dynamic compression processing in accordance with the peak value so that the D-range of the image signal falls within the maximum input D-range of the visual processing unit by converting the image signal based on compression input/output conversion characteristics determined based on the peak value. The visual processing unit performs D-range compression processing so that the D-range of the image signal outputted by the pre-compression unit falls within the predetermined output D-range by converting the image signal outputted by the pre-compression unit based on tone conversion characteristics determined in accordance with the surrounding average luminance signal.

According to this D-range compression apparatus, the D-range can be dynamically compressed to the maximum input D-range of the visual processing unit in advance, in accordance with the peak value in the image, by using a pre-compression unit in an earlier stage than the visual processing unit, even when the peak value≧the maximum input D-range of the visual processing unit. Therefore, D-range compression processing can be performed in accordance with the peak value in the image formed by an input image signal regardless of what variable D-range image signal is inputted into the D-range compression apparatus. As a result, image signals processed by this D-range compression apparatus can always be compressed into an image signal that has a predetermined output D-range (the full output range).

A fourth aspect of the invention is one of the first through third aspects of the invention, in which the amplification unit performs the dynamic amplification processing in accordance with the peak value, further using the surrounding average luminance signal.

Through this, an auto knee function can be achieved while also maintaining the contrast.

Although the reasons for maintaining the contrast will be discussed later, these reasons will be described here briefly using FIG. 14. In FIG. 14, in the image region within the dotted line containing a pixel Po, the surrounding average luminance signals are (essentially) identical for each of the pixels, and therefore the values of all the pixels in this bright image region (including the image signal Yin(Po) corresponding to the pixel Po) are amplified to the same gain (1 or more). For this reason, the surrounding average luminance signal Yave(Po) of the pixel Po in the post-conversion image also changes at the same ratio. Therefore, the brightness contrast of the pixel Po (Yin(Po)/Yave(Po)) does not change before/after the amplification. Accordingly, the local contrast is maintained for the pixel Po (that is, the contrast is not overemphasized even when the D-range has been expanded).

Furthermore, performing gain control based on the surrounding average luminance signal is equivalent to dynamically controlling the diagonal components of the two-dimensional LUT in the visual processing unit from the exterior. The "diagonal components" of the two-dimensional LUT is the output luminance in the case where the image signal and the surrounding average luminance signal (low-frequency component) are the same value, and refers to the conversion characteristics of the surrounding average luminance signal (low-frequency conversion characteristics). The amplification unit controls the gain using the surrounding average luminance signal, thereby achieving a function equivalent to dynamic control of the diagonal components (surrounding luminance conversion characteristics) from the exterior.

The following interpretation can also be made. The multiple tone conversion curves stored in the visual processing unit differ for each surrounding average luminance. Thus performing gain control using the surrounding average luminance is equivalent to adjusting the slopes of the individual curves. This makes it possible to perform processing equivalent to dynamically controlling each tone conversion curve in the visual processing unit even when the visual processing unit is configured of an LUT.

A fifth aspect of the invention is the third or fourth aspect of the invention, in which the pre-compression unit performs the dynamic compression processing in accordance with the peak value, further using the surrounding average luminance signal.

Through this, an auto knee function can be achieved while also maintaining the contrast, even when the peak value≧the maximum input D-range of the visual processing unit.

A sixth aspect of the invention is the fourth aspect of the invention, in which the amplification unit performs the dynamic amplification processing based on amplification input/output conversion characteristics that output a higher value the lower the peak value is.

A seventh aspect of the invention is the fourth or the sixth aspect of the invention, in which the amplification unit performs the dynamic amplification processing based on amplification input/output conversion characteristics that output a higher value the higher the surrounding average luminance signal is.

An eighth aspect of the invention is the sixth or the seventh aspect of the invention, in which the amplification unit achieves the amplification input/output conversion characteristics by multiplying the gain of broken line characteristics calculated from the peak value and the surrounding average luminance signal.

Through this, the amplification unit can be implemented with ease. In particular, the scale of the circuit can be reduced when configuring the amplification unit as hardware.

A ninth aspect of the invention is the sixth or the seventh aspect of the invention, in which the amplification unit achieves the amplification input/output conversion characteristics using broken line characteristics.

Through this, the amplification unit can be implemented with ease. In particular, the scale of the circuit can be reduced when configuring the amplification unit as hardware.

A tenth aspect of the invention is the fourth aspect of the invention, in which, assuming the surrounding average luminance signal is Yave, the peak value is Pin, the output value of the visual processing unit with respect to the peak value Pin is Pout, the value of a knee point is Kp, the image signal inputted to the amplification unit is Yout, the image signal outputted from the amplification unit is Yout', and the point of maximum whiteness determined by the image format is 100%, expressed as "1", the amplification unit performs the dynamic amplification processing by finding the image signal Yout' outputted by the amplification unit using the following formulas:

$k4(Pout)=(1/Pout-1)/(Pout-Kp)$ $g2(Yave, Pin)=k4(Pout)*\max(Yave-Kp, 0)+1$ $Yout'=g2(Yave, Pin)*Yout$ An eleventh aspect of the invention is the fifth aspect of the invention, in which the pre-compression unit performs the dynamic compression processing based on compression input/output conversion characteristics that output a lower value the higher the peak value is.

Through this, the pre-compression unit can be implemented with ease. In particular, the scale of the circuit can be reduced when configuring the pre-compression unit as hardware.

A twelfth aspect of the invention is the fifth or the eleventh aspect of the invention, in which the pre-compression unit performs the dynamic compression processing based on compression input/output conversion characteristics that output a lower value the higher the surrounding average luminance signal is.

A thirteenth aspect of the invention is the eleventh or the twelfth aspect of the invention, in which the pre-compression unit achieves the compression input/output conversion characteristics by multiplying the gain of broken line characteristics calculated from the peak value and the surrounding average luminance signal.

A fourteenth aspect of the invention is the eleventh or the twelfth aspect of the invention, in which the pre-compression unit achieves the compression input/output conversion characteristics using broken line characteristics.

Through this, the pre-compression unit can be implemented with ease. In particular, the scale of the circuit can be reduced when configuring the pre-compression unit as hardware.

A fifteenth aspect of the invention is the fifth aspect of the invention, in which, assuming the surrounding average luminance signal is Yave, the peak value is Pin, the value of a knee point is Kp, the image signal inputted to the pre-compression unit is Yin, the image signal outputted from the pre-compression unit is Yin', and the point of maximum whiteness determined by the image format is 100%, expressed as "1", the pre-compression unit performs the dynamic compression processing by finding the image signal Yin' outputted by the pre-compression unit using the following formulas:

$$k3(Pin)=(2/Pin-1)/(Pin-Kp)$$

$$g1(Yave, Pin)=k3(Pin)*\max(Yave-Kp, 0)+1$$

$$Yin'=g1(Yave, Pin)*Yin$$

A sixteenth aspect of the invention is one of the first through fifteenth aspects of the invention, in which the visual processing unit outputs a lower value the higher the surrounding average luminance signal is.

A seventeenth aspect of the invention is one of the first through sixteenth aspects of the invention, in which the visual processing unit has a two-dimensional LUT that achieves the tone conversion characteristics, and performs the D-range compression processing using the two-dimensional LUT.

Through this, the visual processing unit can achieve the D-range compression processing using a two-dimensional LUT.

An eighteenth aspect of the invention is the seventeenth aspect of the invention, further including an LUT data registration unit that registers data of the two-dimensional LUT of the visual processing unit.

Through this, even if the D-range of an image signal inputted into the visual processing unit has been changed, the data of a two-dimensional LUT corresponding to that D-range is registered, and it is thus possible to perform D-range compression processing on image signals of various D-ranges with this D-range compression apparatus.

A nineteenth aspect of the invention is one of the first through eighteenth aspects of the invention, in which the spatial processing unit calculates the surrounding average luminance signal based on a signal outputted by the pre-compression unit.

A twentieth aspect of the invention is one of the first through nineteenth aspects of the invention, further including a gain multiplication unit that multiplies the image signal with a gain. The visual processing unit outputs a first gain, the first gain being a gain for performing D-range compression processing so that the D-range of the image signal falls within a predetermined output D-range by converting the image signal based on tone conversion characteristics determined in accordance with the surrounding average luminance signal. The amplification unit outputs a second gain obtained by amplifying the first gain. The gain multiplication unit multiplies the image signal with the second gain.

According to this D-range compression apparatus, it is possible to improve the tone reproduction capabilities (bit accuracy), particularly for dark portions, of the visual processing unit, and thus the tone reproduction capabilities (bit accuracy) of dark portions can be improved in images (video) obtained by this D-range compression apparatus.

A twenty-first aspect of the invention is one of the first through the twentieth aspects of the invention, in which the visual processing unit is configured of a two-dimensional look-up table that takes the image signal and the surrounding average luminance signal as its input.

Note that the output of the visual processing unit may be a visually-processed image signal or a gain signal for performing visual processing on an image signal.

Through this, it is possible to perform non-linear tone conversion processing with very fine image quality tuning.

A twenty-second aspect of the invention is a dynamic range (D-range) compression method that uses an image signal having a variable D-range as its input, the method including a spatial processing step, a visual processing step, a peak detection step, and an amplification step. In the spatial processing step, a surrounding average luminance signal is calculated for the image signal. In the visual processing step, D-range compression processing is performed so that the D-range of the image signal falls within a predetermined output D-range by converting the image signal based on tone conversion characteristics determined in accordance with the surrounding average luminance signal. In the peak detection step, the peak value within an image formed by the image signal is detected. In the amplification step, dynamic amplification processing is performed in accordance with the peak value so that the D-range of the image signal outputted in the step of performing D-range compression processing becomes the predetermined output D-range by converting the image signal outputted in the step of performing D-range compression processing based on amplification input/output conversion characteristics determined based on the peak value.

Through this, it is possible to achieve a D-range compression method that achieves the same effects as the first aspect of the invention.

A twenty-third aspect of the invention is a computer-readable recording medium in which is recoded a program that causes a computer to execute D-range compression processing that uses an image signal having a variable D-range as its input. This program causes a computer to execute a spatial processing step, a visual processing step, a peak detection step, and an amplification step. In the spatial processing step, a surrounding average luminance signal is calculated for the image signal. In the visual processing step, D-range compression processing is performed so that the D-range of the image signal falls within a predetermined output D-range by converting the image signal based on tone conversion characteristics determined in accordance with the surrounding average luminance signal. In the peak detection step, the peak value within an image formed by the image signal is detected. In the amplification step, dynamic amplification processing is performed in accordance with the peak value so that the D-range of the image signal outputted in the step of performing D-range compression processing becomes the predetermined output D-range by converting the image signal outputted in the step of performing D-range compression processing based on amplification input/output conversion characteristics determined based on the peak value.

Through this, it is possible to achieve a computer-readable recording medium in which is stored a program that achieves the same effects as the first aspect of the invention.

A twenty-fourth aspect of the invention is an integrated circuit used in a dynamic range (D-range) compression apparatus into which is inputted an image signal having a variable D-range, the circuit including a spatial processing unit, a visual processing unit, a peak detection unit, and an amplification unit. The spatial processing unit calculates a surrounding average luminance signal for the image signal. The visual processing unit performs D-range compression processing so that the D-range of the image signal falls within a predetermined output D-range by converting the image signal based on tone conversion characteristics determined in accordance with the surrounding average luminance signal. The peak detection unit detects the peak value within an image formed by the image signal. The amplification unit performs dynamic amplification processing in accordance with the peak value so that the D-range of the image signal outputted by the visual processing unit becomes the predetermined output D-range by converting the image signal outputted by the visual processing unit based on amplification input/output conversion characteristics determined based on the peak value.

Through this, it is possible to achieve an integrated circuit that achieves the same effects as the first aspect of the invention.

A twenty-fifth aspect of the invention is an imaging apparatus provided with a dynamic range (D-range) compression apparatus into which is inputted an image signal having a variable D-range, the imaging apparatus including a spatial processing unit, a visual processing unit, a peak detection unit, and an amplification unit. The spatial processing unit calculates a surrounding average luminance signal for the image signal. The visual processing unit performs D-range compression processing so that the D-range of the image signal falls within a predetermined output D-range by converting the image signal based on tone conversion characteristics determined in accordance with the surrounding average luminance signal. The peak detection unit detects the peak value within an image formed by the image signal. The amplification unit performs dynamic amplification processing in accordance with the peak value so that the D-range of the image signal outputted by the visual processing unit becomes the predetermined output D-range by converting the image signal outputted by the visual processing unit based on amplification input/output conversion characteristics determined based on the peak value.

Through this, it is possible to achieve an imaging apparatus that achieves the same effects as the first aspect of the invention.

According to the present invention, it is possible to provide a dynamic range compression apparatus, a dynamic range compression method, a program, an integrated circuit, and an imaging apparatus capable of obtaining an image signal compressed at the full output range based on the peak value in an image formed by an input image signal (that is, capable of performing dynamic D-range compression processing in accordance with the peak value in the image), even in the case where an image signal with a variable D-range is inputted.

It is furthermore possible to achieve an auto knee function that maintains the contrast by controlling the gain of a surrounding average luminance signal.

BRIEF DESCRIPTION OF THE DRAWINGS

FIG. 2 is a diagram illustrating brightness contrast characteristics.

FIGS. 6A and 6B are diagrams illustrating problems that arise when there is no auto knee function.

FIGS. 10A and 10B are diagrams illustrating operations performed by the D-range compression apparatus 2000.

FIGS. 12A and 12B are diagrams illustrating operations performed by the D-range compression apparatus 2000.

DETAILED DESCRIPTION OF THE INVENTION.

Below, embodiments of the invention will be described in detail with reference to the drawings.

Note that in the embodiments of the present invention, the Y luma component or L brightness component of the YCbCr, YuV, Lab, Luv, YIQ, or YPbPr color spaces is defined as a "luminance signal". Furthermore, the processing may be performed on the RGB level, in which case the "RGB signals" may be replaced with "luminance signal". Hereinafter, the luminance signal will be described as the image signal.

(First Embodiment)

A D-range compression apparatus 1000, which is a first embodiment of the present invention, will be described with reference to FIGS. 7, 8A, and 8B.

<1.1: Configuration of D-Range Compression Apparatus>

Figure 7:
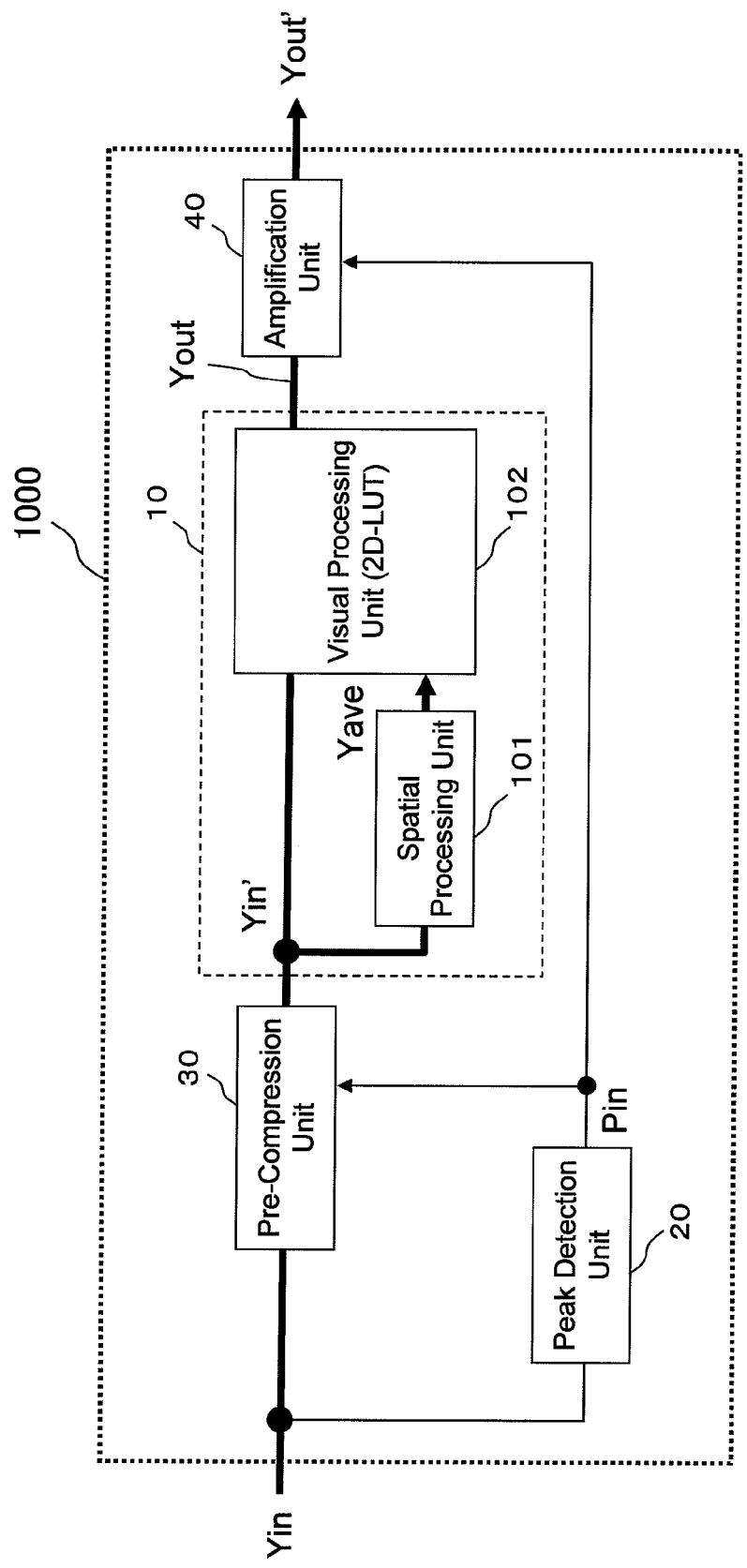
FIG. 7 is a block diagram illustrating the configuration of a D-range compression apparatus 1000 according to a first embodiment of the present invention.

FIG. 7 is a block diagram illustrating the configuration of the D-range compression apparatus 1000 according to the first embodiment of the present invention.

As shown in FIG. 7, the D-range compression apparatus 1000 according to the first embodiment of the present invention includes a peak detection unit 20 that detects the peak value Pin within an image formed by an image signal Yin (within an image formed by the image signal) and a pre-compression unit 30 that dynamically compresses the D-range of the image signal Yin to within the maximum input D-range of a visual processing unit 102 using the peak value Pin. The D-range compression apparatus 1000 also includes a visual processing apparatus 10 that performs visual processing on an output signal Yin' outputted by the pre-compression unit 30 and an amplification unit 40 that dynamically expands the D-range of an output signal Yout outputted by the visual processing apparatus 10 to a predetermined output D-range using the peak value Pin.

Figure 1:
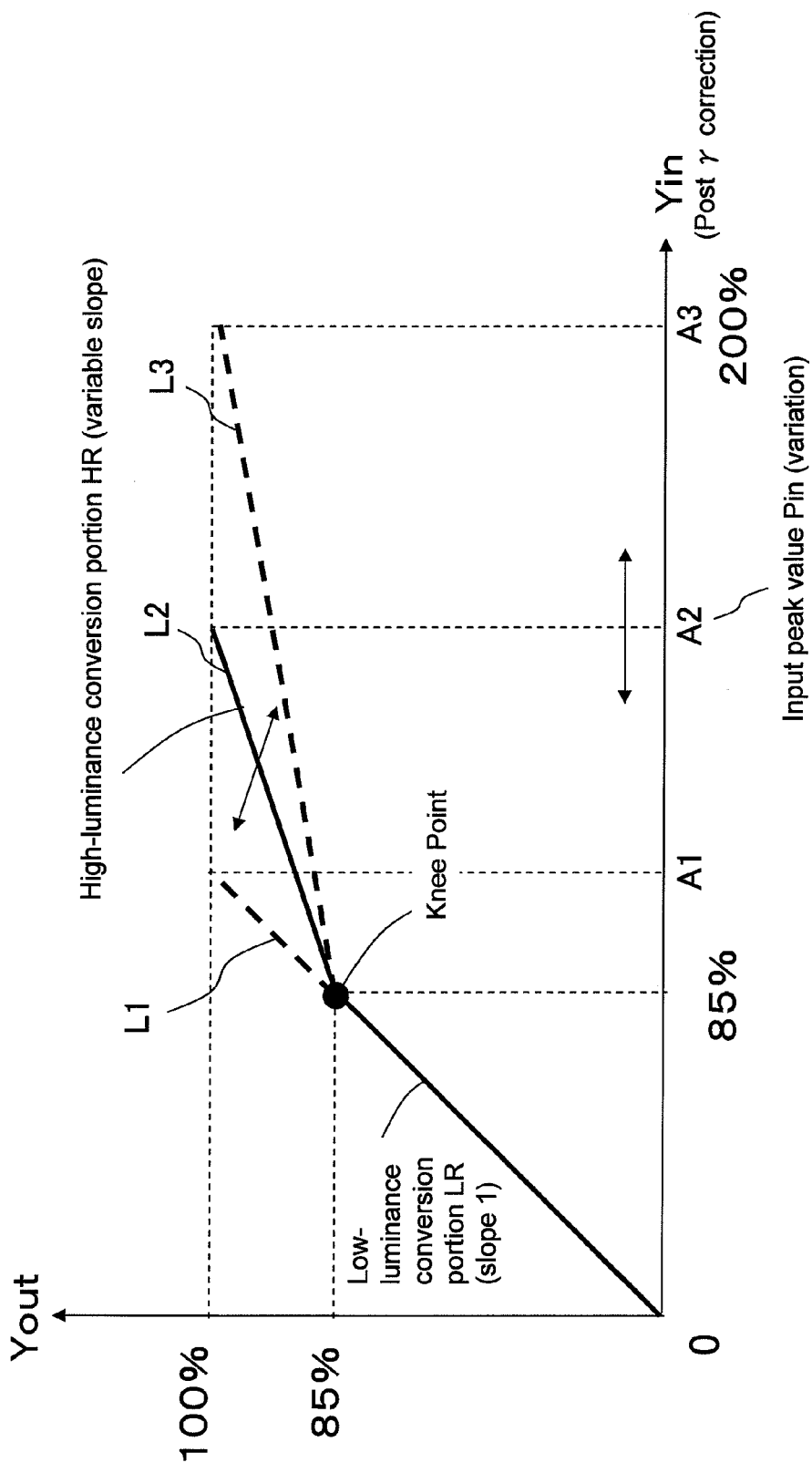
FIG. 1 is a diagram illustrating the input/output characteristics of auto knee processing.
Figure 3:
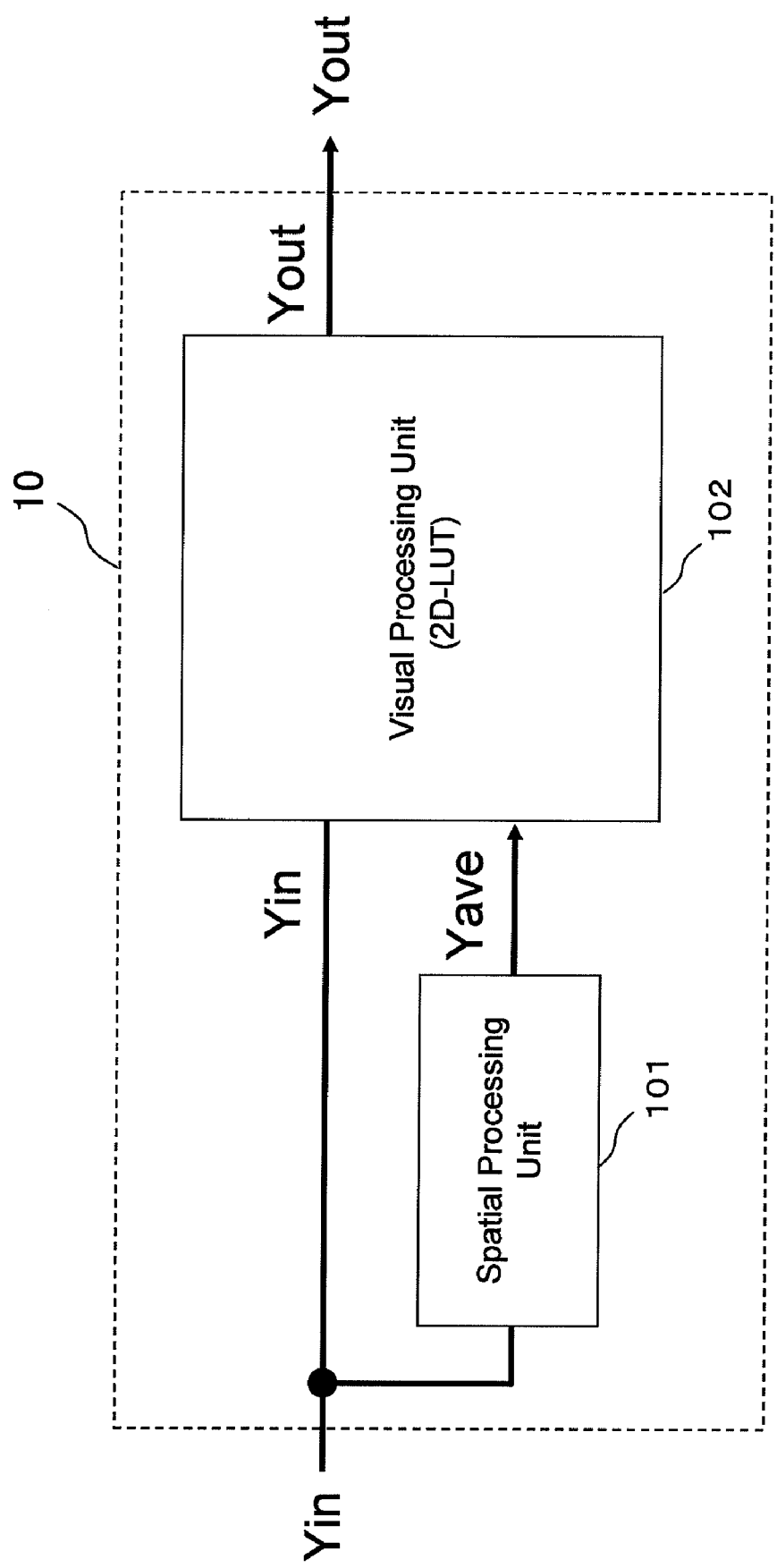
FIG. 3 is a block diagram illustrating a visual processing apparatus 10.

In other words, the D-range compression apparatus 1000 has a configuration in which the peak detection unit 20, pre-compression unit 30, and amplification unit 40 have been added to the visual processing apparatus 10 illustrated in FIG. 3 (the visual processing apparatus disclosed in Patent Documents 1 and 2).

The peak detection unit 20 takes the image signal Yin as its input, detects the peak value Pin of the image signal Yin in the image formed by the image signal Yin, and outputs the detected peak value Pin to the pre-compression unit 30 and the amplification unit 40.

Although the maximum value (the maximum pixel value of the pixels that make up the image formed by the image signal Yin) within the image (within the image formed by the image signal Yin) may simply be used as-is as the peak value Pin detected by the peak detection unit 20, but it should be noted that the embodiment is not limited thereto. For example, the peak value within an image formed by a signal resulting from spatially blurring the image signal Yin (this may be a surrounding average luminance signal) (that is, within an image formed by a signal that has been spatially blurred) may be used as the stated peak value Pin in order to reduce the influence of noise and the like. In the case where the D-range compression apparatus 1000 is to process video, the average of the peak values of the image signals Yin in each frame of an image in which multiple frames are arranged in time series (the temporal average value of the peak value in each frame of multiple frames in the time direction) may be used as the stated peak value Pin. It is necessary for the peak detection unit 20 to scan all the pixels in an image formed by the image signal Yin in order to detect the peak value Pin, and thus a delay of 1V (a delay of one frame) occurs. The peak value of the frame image one frame previous may therefore be used as the stated peak value Pin in order to avoid this problem. This is not limited to video, and may be employed with still images as well. For example, the peak value of one frame previous can be obtained using a live video (image) displayed in a liquid-crystal monitor of an imaging apparatus (camera), and the obtained peak value can then be used as the stated peak value Pin. However, when processing still images, there are cases where the peak value in the image one frame previous differs greatly from the peak value in the image of the present frame when shooting with a flash. Thus it is preferable to use the peak value within the image of the present frame as the stated peak value Pin if possible.

The pre-compression unit 30 takes the image signal Yin and the peak value Pin outputted by the peak detection unit 20 as its inputs, and dynamically compresses the D-range of the image signal Yin to within the maximum input D-range of the visual processing unit 102 using the peak value Pin. The pre-compression unit 30 then inputs the image signal Yin', on which the D-range compression processing has been performed, into a spatial processing unit 101 and the visual processing unit 102 of the visual processing apparatus 10.

As shown in FIG. 7, the visual processing apparatus 10 includes the spatial processing unit 101 and the visual processing unit 102.

The spatial processing unit 101 takes the image signal Yin' outputted by the pre-compression unit 30 as its input, calculates a surrounding average luminance signal Yave for the image signal Yin' outputted by the pre-compression unit 30, and outputs the calculated surrounding average luminance signal Yave to the visual processing unit 102. In other words, the spatial processing unit 101 obtains the surrounding average luminance signal Yave by calculating the average of pixel values of multiple pixels (surrounding pixels) surrounding a pixel corresponding to the image signal Yin' (a pixel of interest) in the image formed by the image signal Yin (or Yin') (this includes weighted average processes and the like as well). Note that the spatial processing unit 101 may also calculate the surrounding average luminance signal Yave by performing an averaging process on the value of a pixel of interest and the values of the pixels surrounding the pixel of interest (this includes weighted average processes and the like as well). The spatial processing unit 101 may also be achieved by an LPF (a two-dimensional LPF).

The visual processing unit 102 has a two-dimensional LUT, and takes the image signal Yin' outputted by the pre-compression unit 30 and the surrounding average luminance signal Yave outputted by the spatial processing unit 101 as its inputs. The visual processing unit 102 converts the D-range of the output signal Yin' from the pre-compression unit 30 using a two-dimensional LUT conversion (tone conversion) with input/output characteristics that differ depending on the surrounding average luminance signal Yave, thereby compressing that D-range to within a predetermined output D-range. The visual processing unit 201 then outputs the image signal obtained by compressing the D-range of the image signal Yin' is then outputted to the amplification unit 40 as the image signal Yout.

The amplification unit 40 takes the image signal Yout outputted by the visual processing unit 102 and the peak value Pin outputted by the peak detection unit 20 as its inputs, and expands the D-range of the image signal Yout to a predetermined output D-range using the peak value Pin. The amplification unit 40 then outputs the image signal obtained by expanding the D-range as an image signal Yout'. For example, assuming that the stated predetermined output D-range is 100% (that is, that the D-range of the image signal outputted by the amplification unit 40 is 100%) and the peak value of the image signal Yout outputted by the visual processing unit 102 is Pout, the amplification unit 40 expands the D-range so that the peak value Pout of the image signal Yout is an image signal at 100%, thereby obtaining the image signal Yout'.

<1.2: Operations of D-Range Compression Apparatus>

Operations of the D-range compression apparatus 1000 configured as described thus far will be described hereinafter with reference to the drawings.

Note that portions that are identical to those of the visual processing apparatus 10 described above are assigned the same reference numerals, and descriptions thereof will be omitted.

Furthermore, the following descriptions assume that the maximum input D-range of the visual processing unit 102 is 200% and the predetermined output D-range is 100% (the full output range).

The image signal Yin is inputted into the peak detection unit 20 and the pre-compression unit 30.

The peak detection unit 20 detects the peak value Pin of the image signal Yin in the image formed by the image signal Yin. The detected peak value Pin is then outputted to the pre-compression unit 30 and the amplification unit 40.

Note that the maximum value within the image (within the image formed by the image signal Yin) may simply be used as-is as the peak value Pin, or the peak value within an image obtained by spatially blurring the image formed by the image signal Yin may be used as the stated peak value Pin in order to reduce the influence of noise and the like, as described above. The average of the peak values in multiple frame images arranged in time series, including the present frame, may also be used as the peak value Pin. Furthermore, the peak value within a frame one previous to the current image may be used as the peak value Pin. In this case, one frame's worth of delay is not present, and thus the time required for the processing performed by the peak detection unit 20 can be reduced.

The image signal Yin inputted into the pre-compression unit 30 is dynamically compressed by the pre-compression unit 30 to within the maximum input D-range of the visual processing unit 102 based on the peak value Pin, and the resultant is outputted to the spatial processing unit 101 and the visual processing unit 102 of the visual processing apparatus 10 as the image signal Yin'.

This will be described in detail using FIGS. 8A and 8B.

Figure 8A:
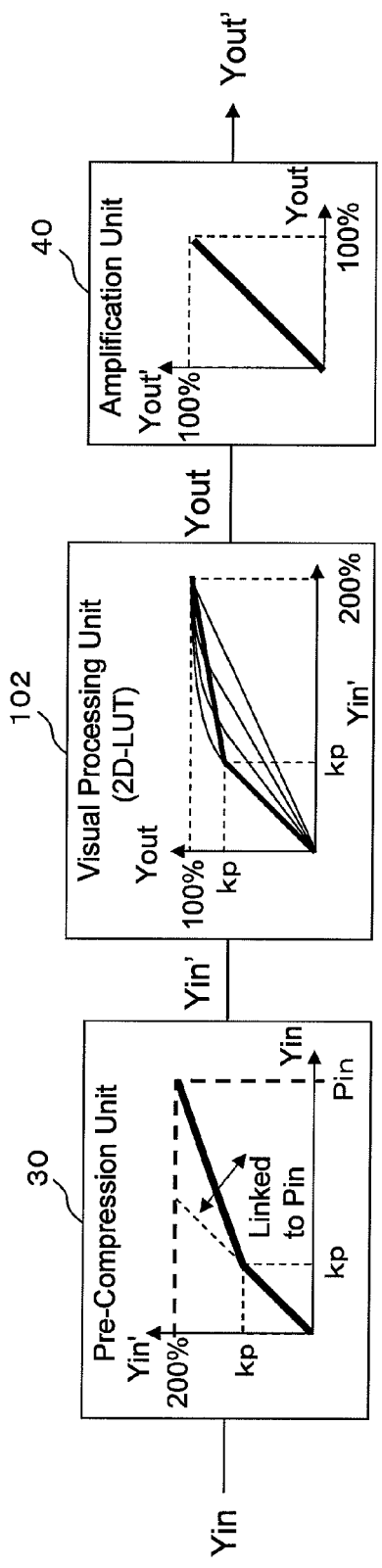
FIGS. 8A and 8B are diagrams illustrating operations performed by the D-range compression apparatus 1000.

FIG. 8A is a diagram illustrating operations of the D-range compression apparatus 1000 in the case where the Pin≧200%. FIG. 8B, meanwhile, is a diagram illustrating operations of the D-range compression apparatus 1000 in the case where the Pin≦200%.

The pre-compression unit 30 dynamically compresses the D-range of the image signal Yin to within the maximum input D-range of the visual processing unit 102 (200%) using the peak value Pin.

The input/output characteristics f1 (Yin, Pin) of the pre-compression unit 30 are set, for example, to the characteristics indicated by the following formulae:

$$Yin' = f1(Yin, Pin) = \min(Yin, k1(Pin)*(Yin - Pin) + 2)$$

$$k1(Pin) = (2 - Kp)/(Pin - Kp)$$

$$Pin = \max(Pin, 2)$$

Here, Kp represents the knee point (Kp≈0.85).

When the Pin≧200%, the input/output characteristics f1(Yin, Pin) of the pre-compression unit 30 are as indicated by the broken line shown in FIG. 8A. The pre-compression unit 30 then performs D-range compression processing only on the high-luminance signal (image signal Yin) from Kp to Pin so that the D-range of the output image signal Yin' is from Kp to 200%. At this time, the pre-compression unit 30 dynamically controls the slope of the broken line so that the peak value Pin of the input image signal Yin is outputted at 200%. Through this, the D-range inputted into the visual processing unit 102 is always dynamically normalized to the maximum input D-range (200%). In other words, such D-range compression processing performed by the pre-compression unit 30 guarantees that the D-range of the image signal Yin' inputted in the visual processing unit 102 is a maximum of 200%.

Figure 8B:
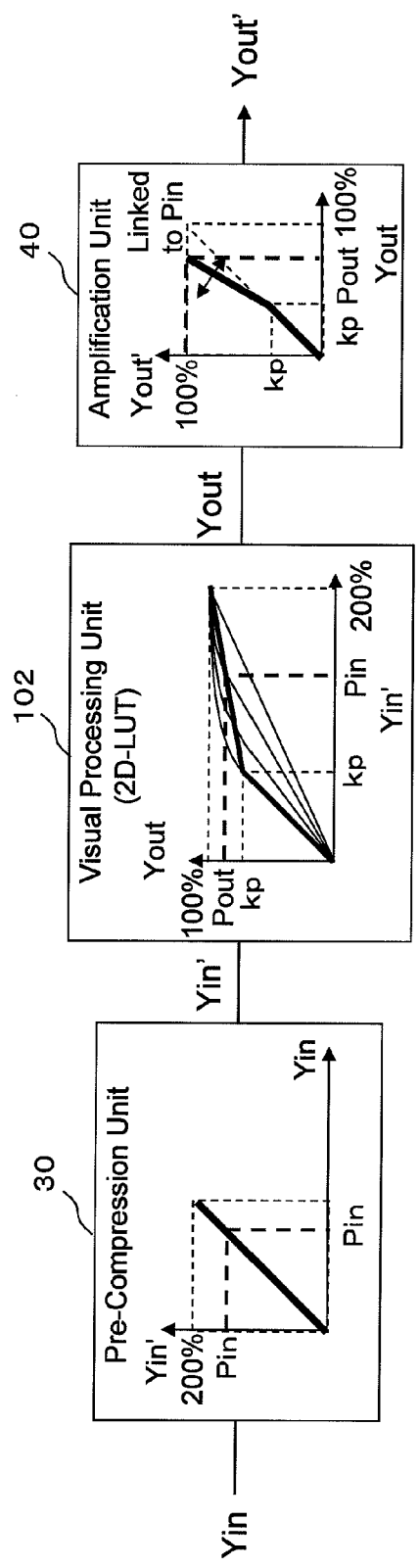

When the Pin≦200%, the input/output characteristics f1(Yin, Pin) of the pre-compression unit 30 is as indicated by the straight line with a slope of 1, as shown in FIG. 8B. The input image signal Yin is outputted as-is from the pre-compression unit 30.

The spatial processing unit 101 calculates the surrounding average luminance signal Yave for the image signal Yin' outputted by the pre-compression unit 30.

For example, the spatial processing unit 101 obtains the surrounding average luminance signal (unsharpened signal) Yave by processing the image signal Yin' with a low-pass filter (a spatial low pass filter). The surrounding average luminance signal (unsharpened signal) Yave is generated through a computation such as the following:

$$Yave = (\Sigma[W_{ij} \times A_{ij}]) \div (\Sigma[W_{ij}])$$

Here, [$W_{ij}$] is a weighting coefficient for the pixel located at row i and column j in the image formed by the image signal Yin', for the target pixel (the pixel of interest) and the surrounding pixels, whereas [$A_{ij}$] is the value of the pixel located at row i and column j for the target pixel and the surrounding pixels. The symbol Σ means to calculate the sum for each of the target pixels and the surrounding pixels.

It should be noted that it is possible to assign a weight coefficient with a smaller value the larger the absolute value of the difference between pixel values, and it is also possible to assign a smaller weight coefficient the larger the distance from the target pixel. The region of the surrounding pixels is a size (image region size) that is set in advance based on the effects, and the visual effect can be increased by setting this region to size that is larger than a predetermined size. For example, when the target image is 1024 pixels in width and 768 pixels in height, the surrounding average luminance signal Yave may be generated from a region (image region) of 80×80 pixels or more.

In addition, the spatial processing unit 101 may use a FIR (Finite Impulse Response) low-pass spatial filter, an IIR (Infinite Impulse Response) low-pass spatial filter, or the like as the low-pass spatial filter for calculating the surrounding average luminance signal Yave.

The visual processing unit 102 converts the D-range of the output image signal Yin' outputted from the pre-compression unit 30 using a two-dimensional LUT with input/output characteristics that differ depending on the surrounding average luminance signal Yave through the following formula:

$$Yout = \mathrm{lut}(Yin', Yave)$$

Figure 4:
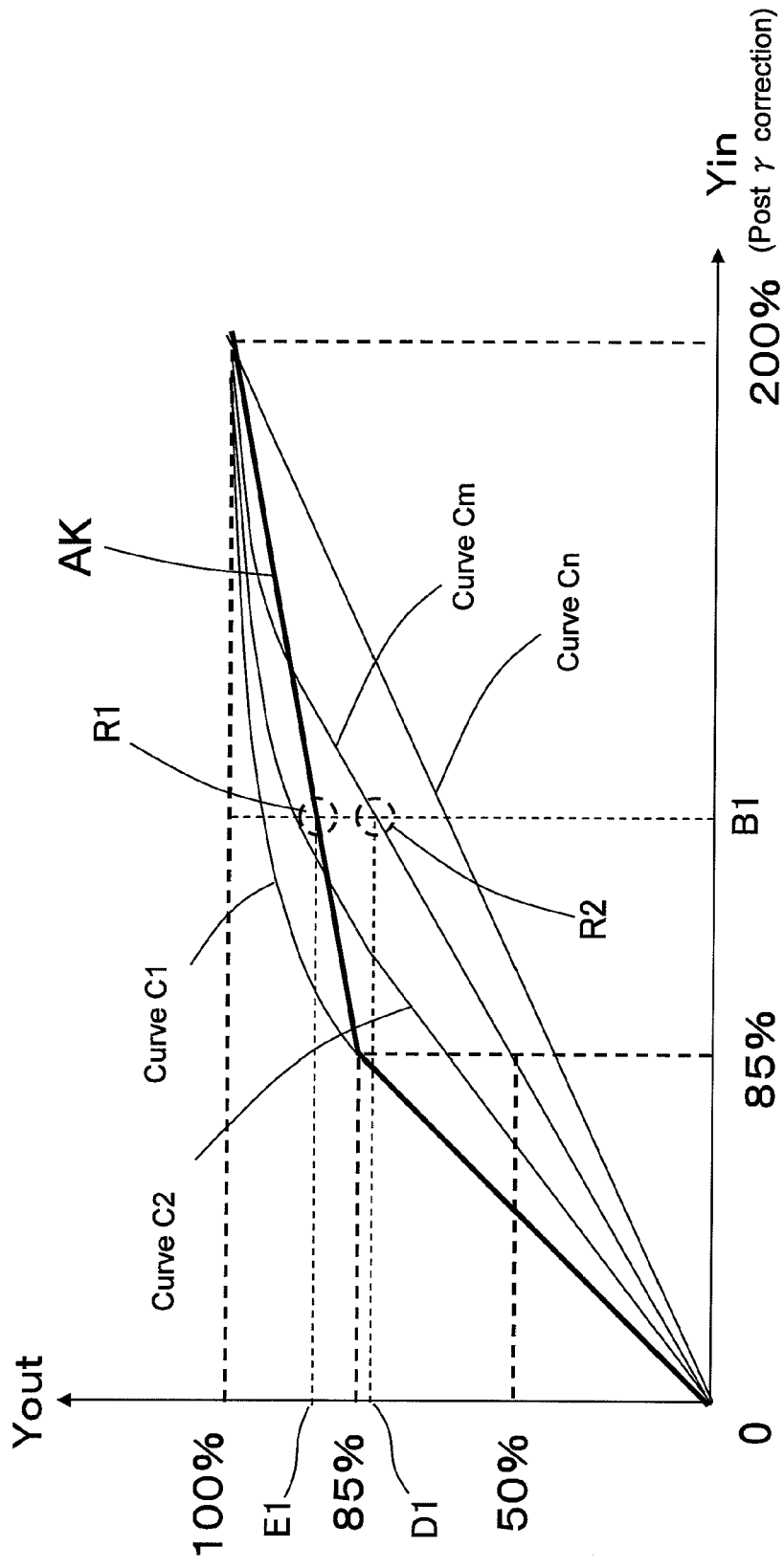
FIG. 4 is a diagram illustrating the input/output characteristics of a visual processing unit 102 during visual knee processing.
Figures 5A, 5B:
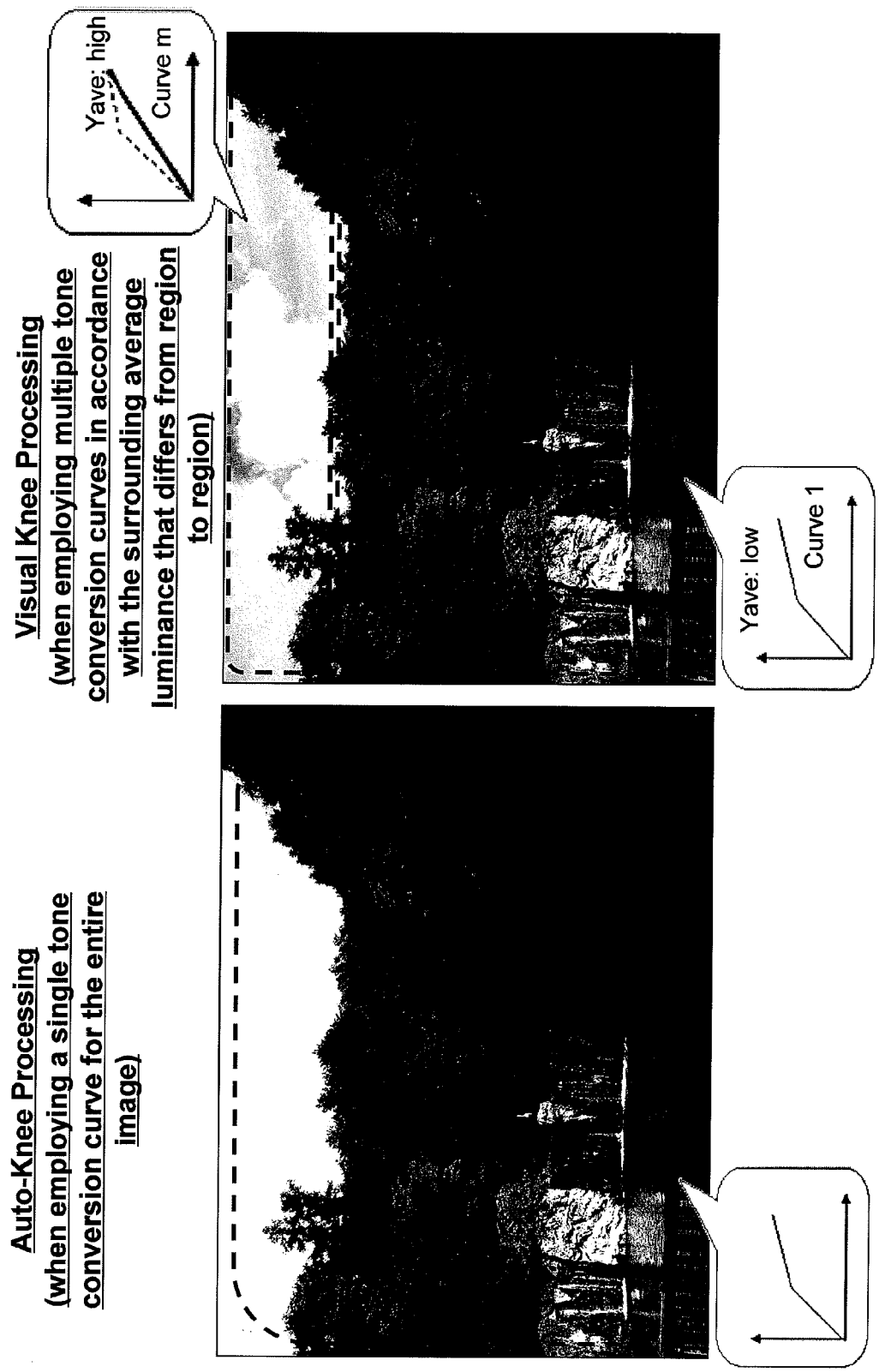
FIGS. 5A and 5B are diagrams illustrating the operations of and images processed through auto knee processing and visual knee processing, respectively.

Through this, that D-range is compressed to within the predetermined output D-range. The input/output characteristics lut(Yin', Yave) of the LUT are the same as the characteristics shown in FIG. 4.

When the Pin≧200%, the visual processing unit 102 further compresses the D-range of the image signal Yin', outputted by the pre-compression unit 30 and normalized to 200%, to 100%, without a drop in contrast.

However, when the Pin≦200%, the visual processing unit 102 compresses the D-range of the input image signal Yin that has passed through the pre-compression unit 30 as-is (in other words, the image signal Yin') to within 100%. At this time, the Pin≦200%, and thus the output value Pout outputted by the visual processing unit 102 with respect to the peak input value Pin is:

$$Pout = \mathrm{lut}(Pin, Pin) < 1$$

Thus the full output range of 100% cannot be used in its entirety. For this reason, the image formed by the image signal Yout (when the image signal Yout is outputted by the visual processing unit 102 with a Pin≦200%) is a dark image, similar to that shown in FIG. 6B. In other words, in this case, the unintentionally dark image pointed out as a problem in FIG. 6B is outputted by the D-range compression apparatus 1000.

Note that "visual processing" is processing for giving characteristics that are close to human vision, and is for determining the value of an output signal based on the contrast between the value of a target pixel of an image signal that has been input and the values (brightness) of pixels around that target pixel. The visual processing may be adopted in backlight correction, knee processing, D-range compression processing, color processing, and brightness adjustment (including grayscale processing and contrast adjustment), for example.

Furthermore, the visual processing unit 102 may perform the visual processing using a processing circuit. In particular, if the two-dimensional LUT of the visual processing unit 120 is provided with profiles, which are characteristics that can be approximated by a simple line, then it is possible to eliminate the two-dimensional LUT table, thereby reducing the scale of the circuit for the visual processing apparatus 10.

The amplification unit 40 executes a D-range expansion process (dynamic D-range expansion process) on the output image signal Yout outputted by the visual processing unit 102 so that the D-range of the image signal Yout outputted by the visual processing unit 102 becomes the predetermined output D-range (full output range) regardless of the peak value Pin. In other words, the amplification unit 40 executes dynamic D-range expansion processing in accordance with the peak value Pin on the output image signal Yout outputted by the visual processing unit 102. Through this, the image signal Yout' outputted by the amplification unit 40 is an image signal with the full output range (in the present embodiment, 100%). This will be described in detail using the following formulas.

The input/output characteristics f2 (Yout, Pin) of the amplification unit 40 are set, for example, to the characteristics indicated by the following formulae:

$$Yout' = f2(Yout, Pin) = \max(Yout, k2(Pin)*(Yout-Kp)+Kp)$$

$$k2(Pin) = (1-Kp)/(Pout-Kp)$$

$$Pout = \text{lut}(Pin, Pin)$$

$$Pin = \max(1, \min(Pin, 2))$$

Here, max(1,min(Pin,2)) is used because auto knee processing is normally performed only on images (images formed by the image signal Yin) for which 1≦Pin≦2, and thus it is sufficient to execute the amplification process (DR expansion process) performed by the amplification unit 40 only when Pin≧1. Furthermore, the output peak value Pout is taken as the diagonal components of the LUT (in other words, the output value of the LUT when two of the LUT inputs are the same; with the above formulae, when both LUT inputs are Pin, the output value is Pout) because normally, most images have many low-frequency components and thus there are many cases where Yin≈Yave.

When the Pin≧200%, the input/output characteristics f2(Yout, Pin) of the amplification unit 40 are as indicated by the straight line with a slope of 1, as shown in FIG. 8A, and thus the output signal Yout outputted by the visual processing unit 102 is outputted as-is from the amplification unit 40. In this case, the amplification processing (D-range expansion processing) is not performed by the amplification unit 40 because the image signal Yout has already been compressed by the visual processing unit 102 to the full output range (100%). In other words, in this case, the output image signal Yout outputted by the visual processing unit 102 is an image signal with the full output range (100%).

When, however, the Pin≦200%, the input/output characteristics f2(Yout, Pin) of the amplification unit 40 are as indicated by the broken line shown in FIG. 8B, and thus the image signal Yout in the range of Kp to Pout of the high-luminance signal, which has been over-darkened by the processing performed by the visual processing unit 102, is expanded to the image signal Yout' in the range of Kp to 100% (D-range expansion). Through this, the image signal Yout' outputted by the amplification unit 40 is an image signal with the full output range (100%).

As described thus far, with the D-range compression apparatus 1000 according to the first embodiment of the present invention, image signals can always be dynamically compressed to the full output range, even if those signals have a variable D-range. In other words, the D-range compression apparatus 1000 makes it possible to consistently obtain an image signal with a full output range regardless of the peak value Pin within the image formed by the image signal. To put it differently, the D-range compression apparatus 1000 is capable of performing appropriate D-range compression processing in accordance with the peak value Pin.

Note that the pre-compression unit 30 and the amplification unit 40 sometimes alter the contrast, but in the common case where the peak input value is near 200%, the contrast alteration is of a level that can be ignored, and thus the appropriate D-range compression can be performed in accordance with the peak value Pin.

(Second Embodiment)

In the first embodiment of the present invention, the pre-compression unit 30 and the amplification unit 40 performed control using only the peak value Pin; however, in a second embodiment of the present invention, a D-range compression apparatus 2000 performs control using the surrounding average luminance signal Yave in addition to the peak value Pin, thereby making it possible to maintain the contrast (the contrast of the processed image) during the pre-compression processing and amplification processing as well. This D-range compression apparatus 2000 will be described using FIGS. 9 to 12B.

<2.1: Configuration of D-Range Compression Apparatus>

Figure 9:
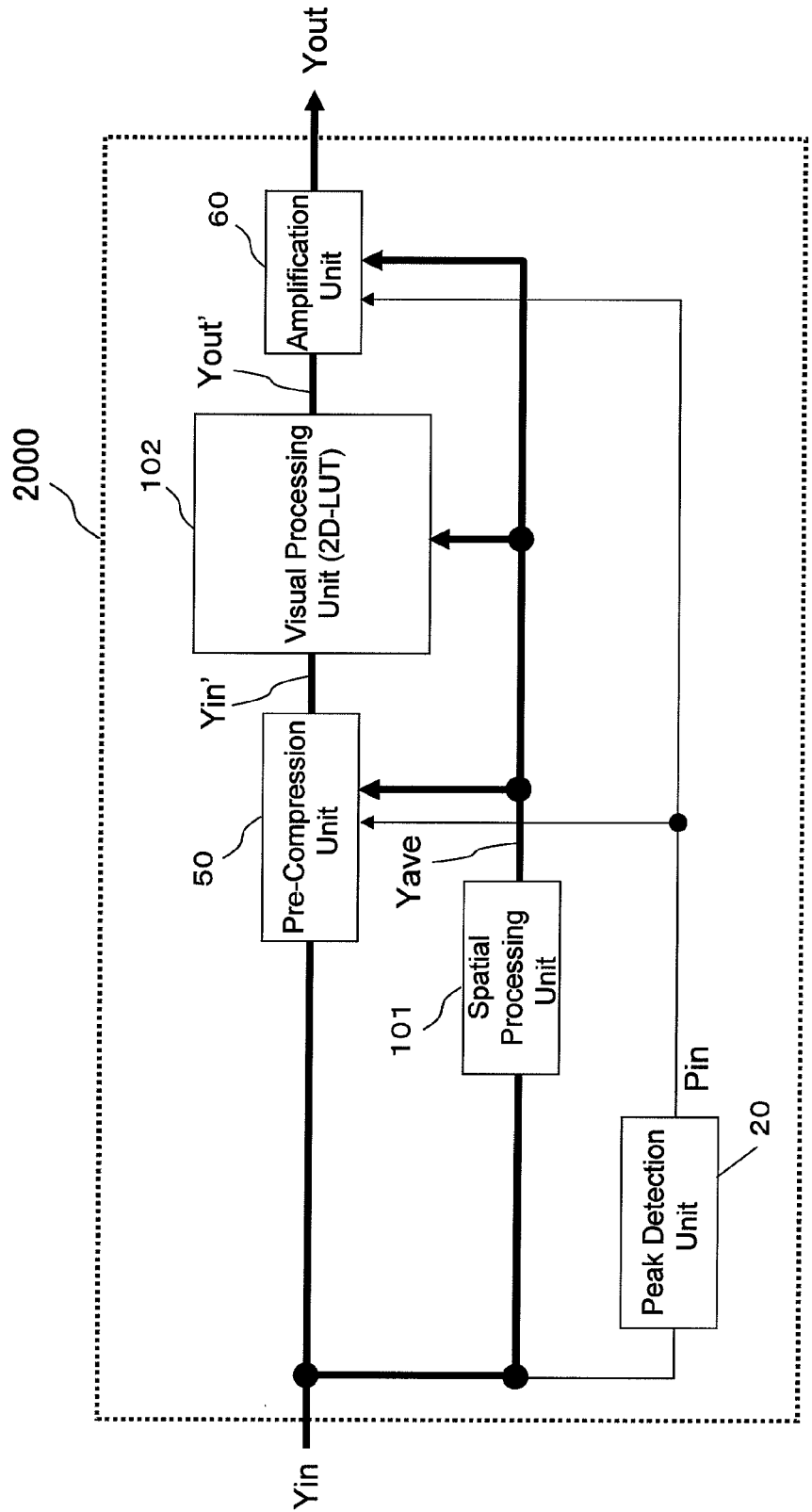
FIG. 9 is a block diagram illustrating the configuration of a D-range compression apparatus 2000 according to a second embodiment of the present invention.

FIG. 9 is a block diagram illustrating the configuration of the D-range compression apparatus 2000 according to the second embodiment of the present invention.

As shown in FIG. 9, the D-range compression apparatus 2000 according to the second embodiment of the present invention includes a peak detection unit 20 that detects the peak value Pin within an image formed by an image signal Yin (within an image formed by the image signal), a spatial processing unit 101 that calculates a surrounding average luminance signal Yave for the image signal Yin, and a pre-compression unit 50 that dynamically compresses the D-range of the image signal Yin to within the maximum input D-range of a visual processing unit 102 using the peak value Pin and the surrounding average luminance signal Yave. The D-range compression apparatus 2000 also includes a visual processing unit 102 that converts the D-range of the output image signal Yin' from the pre-compression unit 50 using a two-dimensional LUT with input/output characteristics that differ depending on the surrounding average luminance signal Yave, thereby compressing that D-range to within a predetermined output D-range, and an amplification unit 60 that dynamically expands the D-range of the output image signal Yout' outputted by the visual processing unit 102 to a maximum of a predetermined output D-range, using the peak value Pin and the surrounding average luminance signal Yave.

Here, portions that are identical to those of the D-range compression apparatus 1000 in the first embodiment are assigned the same reference numerals, and descriptions thereof will be omitted.

The spatial processing unit 101 takes the image signal Yin as its input, obtains the surrounding average luminance signal Yave based on the image signal Yin, and outputs the obtained surrounding average luminance signal Yave to the pre-compression unit 50, the visual processing unit 102, and the amplification unit 60. Note that the spatial processing unit 101 has the same functions as that in the D-range compression apparatus 1000 according to the first embodiment, and the only difference is the input/output relationship (connection relationship).

The pre-compression unit 50 takes the image signal Yin, the peak value Pin outputted by the peak detection unit 20, and the surrounding average luminance signal Yave outputted by the spatial processing unit 101 as its inputs, and dynamically compresses the D-range of the image signal Yin to within the maximum input D-range of the visual processing unit 102 using the peak value Pin and the surrounding average luminance signal Yave. The pre-compression unit 50 then outputs the image signal Yin' on which the compression processing has been performed to the visual processing unit 102.

The visual processing unit 102 is functionally identical to the visual processing unit 102 of the D-range compression apparatus 1000 according to the first embodiment. The spatial processing unit 101 takes the surrounding average luminance signal Yave outputted by the spatial processing unit 101 and the image signal Yin' outputted by the pre-compression unit 50 as its input, and outputs the image signal Yout' converted using a two-dimensional LUT to the amplification unit 60.

The amplification unit 60 takes the image signal Yout' outputted by the visual processing unit 102, the surrounding average luminance signal Yave outputted by the spatial processing unit 101, and the peak value Pin outputted by the peak detection unit 20 as its inputs, and dynamically expands the D-range of the output image signal Yout' outputted by the visual processing unit 102 to a predetermined output D-range using the peak value Pin and the surrounding average luminance signal Yave.

The amplification unit 60 executes a D-range expansion process (dynamic D-range expansion process) on the output image signal Yout outputted by the visual processing unit 102 so that, based on the surrounding average luminance signal Yave, the D-range of the image signal Yout' outputted by the visual processing unit 102 becomes the predetermined output D-range (full output range) regardless of the peak value Pin. In other words, the amplification unit 60 executes, based on the surrounding average luminance signal Yave, the dynamic D-range expansion processing in accordance with the peak value Pin on the output image signal Yout' outputted by the visual processing unit 102. Through this, the image signal Yout' outputted by the amplification unit 60 is an image signal with the full output range (in the present embodiment, 100%).

<2.2: Operations of D-Range Compression Apparatus>

Operations of the D-range compression apparatus 2000 configured as described thus far will be described hereinafter with reference to FIGS. 10 to 12.

FIGS. 10A to 12B are diagrams illustrating operations of the D-range compression apparatus 2000.

In FIGS. 10A to 12B, the A diagrams illustrate operations of the D-range compression apparatus 2000 when the Pin≧200%, whereas the B diagrams illustrate operations of the D-range compression apparatus 2000 when the Pin≦200%. To be more specific, FIGS. 10A to 12B indicate three configuration patterns for the pre-compression unit 50 and the amplification unit 60. FIGS. 10A and 10B are diagrams illustrating a case where the functionality of the pre-compression unit 50 and the amplification unit 60 is achieved by gain multiplication. FIGS. 11A and 11B are diagrams illustrating a case where the functionality of the pre-compression unit 50 and the amplification unit 60 is achieved by gain broken line approximation. Finally, FIGS. 12A and 12B are diagrams illustrating a case where the functionality of the pre-compression unit 50 and the amplification unit 60 is achieved by slope control.

The pre-compression unit 50 dynamically compresses the D-range of the image signal Yin to within the maximum input D-range of the visual processing unit 102 using the peak value Pin and the surrounding average luminance signal Yave.

Here, in order to perform the processing of the pre-compression unit 50 only on the image (the image formed by the image signal Yin) for which the Pin≧200%, the pre-compression unit 50 performs its processing using a peak input value Pin restricted to 200% as the value for Pin. In other words, the pre-compression unit 50 performs its processing using a value for Pin found through the following formula:

$$Pin = max(Pin, 2)$$

Hereinafter, three examples of compression input/output conversion characteristics f3 (Yin, Yave, Pin) of the pre-compression unit 50 will be described.

The first compression input/output conversion characteristic can be set to, for example, the characteristic indicated by the following formula (shown in FIG. 10A):

$$Yin' = f3(Yin, Yave, Pin) = Yin * g1(Yave, Pin)$$

$$g1(Yave, Pin) = f1(Yave, Pin)/Yave$$

In other words, when the input/output characteristics f1(Yin, Pin) of the pre-compression unit 30 are expressed in gain form, as in the following:

$$g1(Yin, Pin) = f1(Yin, Pin)/Yin$$

the pre-compression unit 50 calculates a gain g1(Yave, Pin) in which the input has been changed from the image signal Yin to the surrounding average luminance signal Yave. The pre-compression unit 50 then obtains the image signal Yin' by multiplying the calculated gain g1(Yave, Pin) with the input image signal Yin.

Through this, the sense of brightness in the overall image is held the same as with the pre-compression unit 30, and the image signal Yin is converted to the image signal Yin' using gains that differ for each luminance region in an image depending on the surrounding average luminance, thereby maintaining the contrast within the image formed by the image signal Yin'.

Figure 11A:
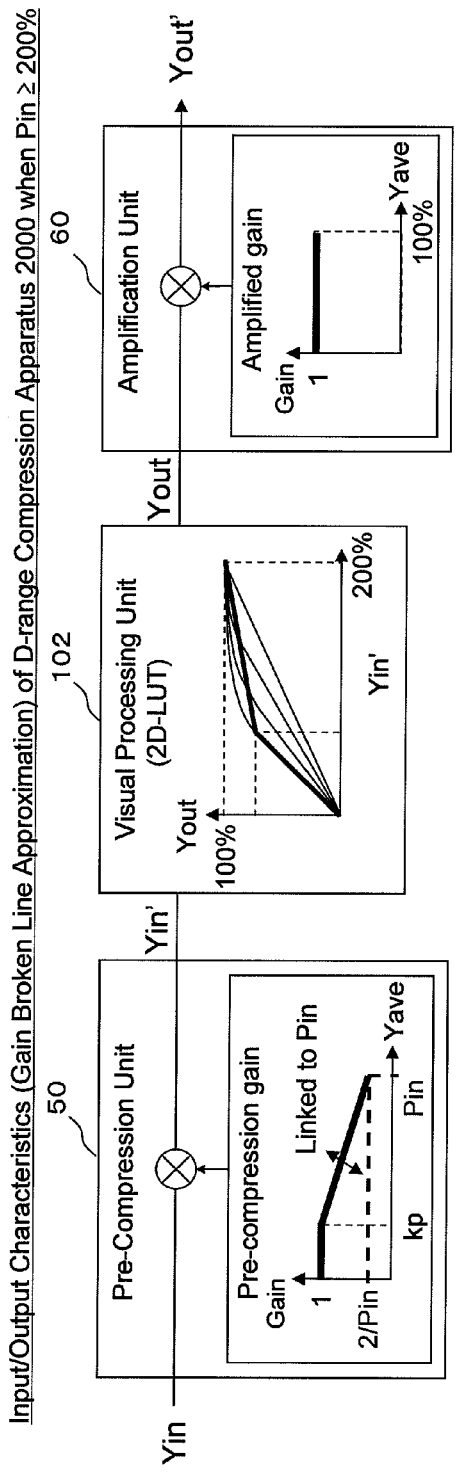
FIGS. 11A and 11B are diagrams illustrating operations performed by the D-range compression apparatus 2000.

The second compression input/output conversion characteristic is a simplified version that does not use a division circuit. In other words, the stated gain curve portion (the curve portion where Yave in the pre-compression gain curve is Kp to Pin indicated in the portion of the pre-compression unit 50 shown in FIG. 10A) may be approximated by a broken line, and in such a case, for example, the pre-compression gain characteristics of the pre-compression unit 50 may be achieved by two broken lines, as indicated in FIG. 11A. In other words, using the pre-compression gain characteristics determined through the following formula:

$$g1(Yave, Pin) = k3(Pin) * max(Yave - Kp, 0) + 1$$

$$k3(Pin) = (2/Pin - 1)/(Pin - Kp)$$

the processing performed by the pre-compression unit 50 may be achieved.

The third compression input/output conversion characteristic achieves the input/output characteristics (Yin–Yin' input/output characteristics) of the pre-compression unit 50 by changing the knee point Kp in the pre-compression unit 30 based on the surrounding average luminance signal Yave, as shown in FIG. 12A. In other words, for example, taking the knee point Kp' that has been changed as:

$$Kp' = Kp * (Pin - Yave)/(Pin - Kp)$$

it is possible to achieve the processing performed by the pre-compression unit 50.

The amplification unit 60 executes a D-range expansion process (dynamic D-range expansion process) on the output image signal Yout outputted by the visual processing unit 102 so that, based on the surrounding average luminance signal Yave, the D-range of the image signal Yout outputted by the visual processing unit 102 becomes the predetermined output D-range (full output range) regardless of the peak value Pin. In other words, the amplification unit 60 executes, based on the surrounding average luminance signal Yave, the dynamic D-range expansion processing in accordance with the peak value Pin on the output image signal Yout outputted by the visual processing unit 102. Through this, the image signal Yout' outputted by the amplification unit 60 is an image signal with the full output range (in the present embodiment, 100%). This will be described in detail using the following formulas.

Here, normally, just as the auto knee processing may be performed on the image (the image formed by the image signal Yin) for which the Pin≧100% only, the processing performed by the amplification unit 60 may be performed on the image for which the Pin≧100% only as well. Furthermore, the amplification unit 60 may be operated when the Pin≦200% only. For this reason, the amplification unit 60 performs processing where the peak input value Pin is restricted to 1≦Pin≦2. In other words, the amplification unit 60 performs processing using the value of Pin obtained through the following formula:

$$Pin=\max(1, \min(Pin, 2))$$

Meanwhile, the output value Pout outputted by the visual processing unit 102 with respect to the peak input value Pin is:

$$Pout=\text{lut}(Pin, Pin)$$

In other words, the approximation is performed taking the output peak value Pout as the diagonal components of the LUT (in other words, the output value of the LUT when two of the LUT inputs are the same; with the above formulae, when both LUT inputs are Pin, the output value is Pout). Note that normally, most images have many low-frequency components and thus there are many cases where Yin≈Yave, and therefore such approximation is not problematic.

Hereinafter, three examples of amplification input/output conversion characteristics f4(Yout, Yave, Pin) of the amplification unit 60 will be described.

The first amplification input/output conversion characteristic can be set to, for example, the characteristic indicated by the following formula (this characteristic is shown in FIG. 10B):

$$Yout'=f4(Yout, Yave, Pin)=Yout*g2(Yave, Pin)$$

$$g2(Yave, Pin)=f2(Yave, Pin)/Yave$$

In other words, when the input/output characteristics f2(Yin, Pin) of the amplification unit 40 are expressed in gain form, as in the following:

$$g2(Yin, Pin)=f2(Yin, Pin)/Yin$$

the amplification unit 60 calculates a gain g2(Yave, Pin) in which the input has been changed from the image signal Yin to the surrounding average luminance signal Yave. The amplification unit 60 then obtains the image signal Yout' by multiplying the calculated gain g2(Yave, Pin) with the input image signal Yin.

Through this, the sense of brightness in the overall image is held the same as with the amplification unit 40, and the image signal Yout is converted to the image signal Yout' using gains that differ for each luminance region in an image depending on the surrounding average luminance, thereby maintaining the contrast within the image formed by the image signal Yout'.

Figure 11B:
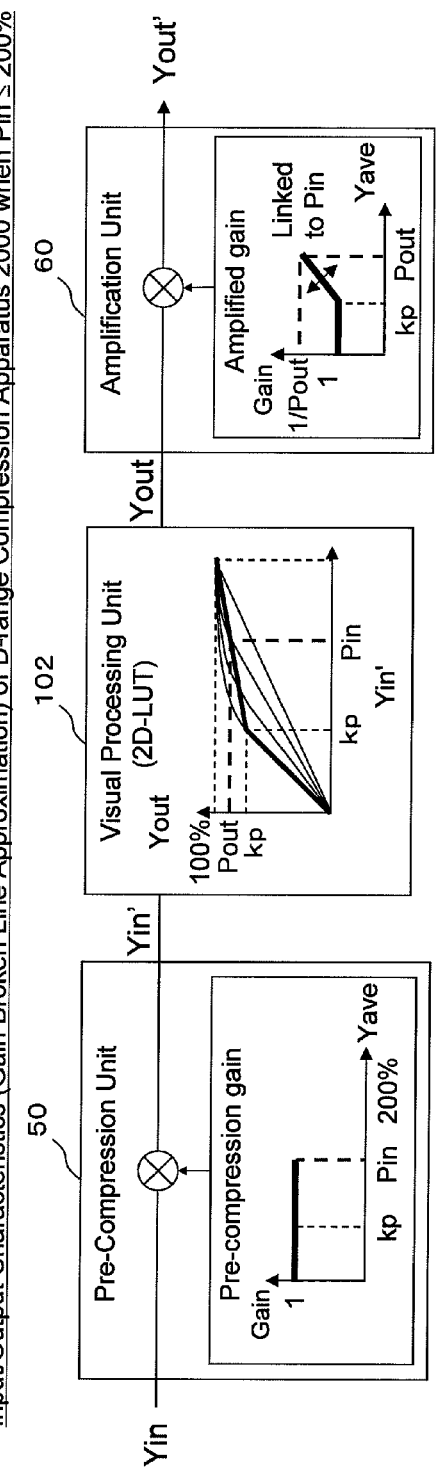

The second amplification input/output conversion characteristic is a simplified version that does not use a division circuit. In other words, the stated gain curve portion (the curve portion where Yave in the amplification gain curve is Kp to Pout indicated in the portion of the amplification unit 60 shown in FIG. 10B) may be approximated by a broken line, and in such a case, for example, the amplification gain characteristics of the amplification unit 60 may be achieved by two broken lines, as indicated in FIG. 11B. In other words, using the amplification gain characteristics determined through the following formula:

$$g2(Yave, Pin)=k4(Pout)*\max(Yave-Kp, 0)+1$$

$$k4(Pout)=(1/Pout-1)/(Pout-Kp)$$

the processing performed by the amplification unit 60 may be achieved.

The third amplification input/output conversion characteristic achieves the input/output characteristics (Yout–Yout' input/output characteristics) of the amplification unit 60 by changing the knee point Kp in the pre-compression unit 50 based on the surrounding average luminance signal Yave, as shown in FIG. 12A. In other words, for example, when the knee point Kp" that has been changed is taken as:

$$Kp''=Kp*(Pout-Yave)/(Pout-Kp)$$

it is possible to achieve the processing performed by the amplification unit 60.

As described thus far, with the D-range compression apparatus 2000 according to the second embodiment of the present invention, inputted image signals can always be dynamically compressed to the full output range while maintaining the contrast, even if those signals have a variable D-range, because the pre-compression unit 50 and the amplification unit 60 are controlled using the peak value Pin and the surrounding average luminance signal Yave. In other words, with the D-range compression apparatus 2000, an image signal with the full output range can be obtained consistently, and an image signal forming an image in which the contrast is maintained can be obtained, even if the inputted image signals have a variable D-range.

<Explanation with an Example>

An example of the processing performed by the D-range compression apparatus 2000 will be described next using FIG. 14.

Figure 14:
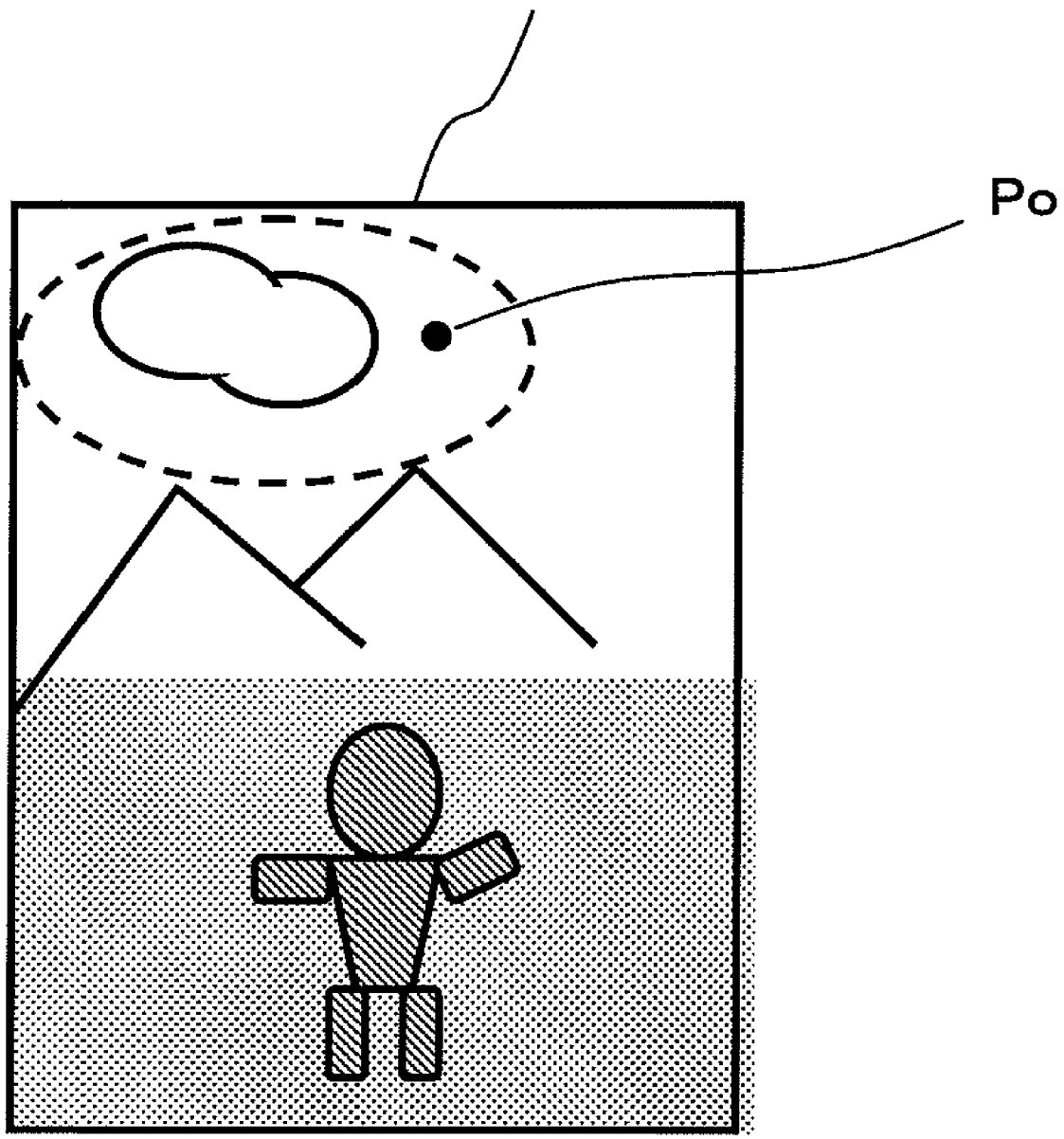
FIG. 14 is a schematic diagram illustrating an example of processing performed by the D-range compression apparatus 2000.

FIG. 14 is a diagram schematically illustrating an image Img3 that is processed by the D-range compression apparatus 2000.

The image Img3 is assumed to be an image formed by the image signal Yin. The pixel indicated by a point Po in FIG. 14 is assumed to be a bright pixel located in a bright region. The pixel value (equivalent to the input image signal Yin) of the pixel indicated by the point Po (called "pixel Po") and the surrounding average luminance signal Yave are assumed to be as follows:

$$Yin(Po) \geq Kp$$

$$Yave(Po) \geq Kp$$

Note that in the above formulas, Yin(X) indicates the value of the image signal Yin for a pixel X (a pixel value) and Yave(X) indicates the value of the surrounding average luminance signal Yave for the pixel X. Kp, meanwhile, represents the knee point.

(1) First, the case where the peak value Pin≧200% will be described.

First, the input D-range is compressed from Pin to 200% by the pre-compression unit 50.

In FIG. 14, in the image region within the dotted line containing a pixel Po, the surrounding average luminance signals are (essentially) identical for each of the pixels, and therefore the values of all the pixels in this bright image region (including Yin(Po)) are compressed to the same gain (1 or less). For this reason, the surrounding average luminance signal Yave(Po) of the pixel Po in the post-conversion image also changes at the same ratio. Therefore, the brightness contrast of the pixel Po (Yin(Po)/Yave(Po)) does not change before/after the compression. Accordingly, the local contrast is maintained for the pixel Po (that is, a drop in the contrast is suppressed even when the D-range has been compressed).

Incidentally, with the compression processing performed by the pre-compression unit 30 in the D-range compression apparatus 1000, only the pixels in the image region within the dotted line for which Yin≧Kp are compressed, and thus the brightness contrast ratio for the pixel Po (Yin(Po)/Yave(Po)) drops. In other words, there are cases where the contrast drops more with processing performed by the D-range compression apparatus 1000 than with processing performed by the D-range compression apparatus 2000.

Next, the D-range is compressed further, from 200% to 100%, by the visual processing unit 102. The D-range is compressed to 100% without a drop in contrast here as well, through compression processing using the surrounding average luminance signal.

Finally, because the Pin≧200%, the signal is simply put through the amplification unit 60.

Through the above processing, the D-range compression apparatus 2000 compresses the input D-range to 100% (the full output range) without a drop in contrast.

(2) Next, the case where the peak value Pin≦200% will be described.

First, because the Pin≦200%, the signal is simply put through the pre-compression unit.

Next, the input D-range is compressed from Pin to Pout (≦100%) by the visual processing unit 102. The D-range is compressed to Pout (≦100%) without a drop in contrast here, through compression processing using the surrounding average luminance signal.

Finally, the amplification unit 60 expands the D-range from Pout to 100%.

In FIG. 14, in the image region within the dotted line containing a pixel Po, the surrounding average luminance signals are (essentially) identical for each of the pixels, and therefore the values of all the pixels in this bright image region (including Yin(Po)) are amplified to the same gain (1 or more). For this reason, the surrounding average luminance signal Yave(Po) of the pixel Po in the post-conversion image also changes at the same ratio. Therefore, the brightness contrast of the pixel Po (Yin(Po)/Yave(Po)) does not change before/after the amplification. Accordingly, the local contrast is maintained for the pixel Po (that is, the contrast is not overemphasized even when the D-range has been expanded).

Incidentally, with the amplification processing performed by the amplification unit 40 in the D-range compression apparatus 1000, only the pixels in the image region within the dotted line for which Yin≧Kp are amplified, and thus the brightness contrast ratio for the pixel Po (Yin(Po)/Yave(Po)) increases. In other words, there are cases where the contrast is overemphasized more with processing performed by the D-range compression apparatus 1000 than with processing performed by the D-range compression apparatus 2000.

Through the above processing, the D-range compression apparatus 2000 compresses the input D-range to 100% (the full output range) without a drop in contrast.

(Third Embodiment)

The D-range compression apparatus 2000 according to the second embodiment of the present invention is configured so that the pre-compression processing is not performed on the surrounding average luminance signal Yave; however, with a D-range compression apparatus 3000 according to a third embodiment of the present invention, the D-ranges of two inputs signals of a two-dimensional LUT in the visual processing unit 102 are aligned by performing pre-compression processing on the input signal of the spatial processing unit 101, thereby making it possible to organize the look-up table data of the two-dimensional LUT as a square matrix. The present embodiment will be described using FIG. 13.

Figure 13:
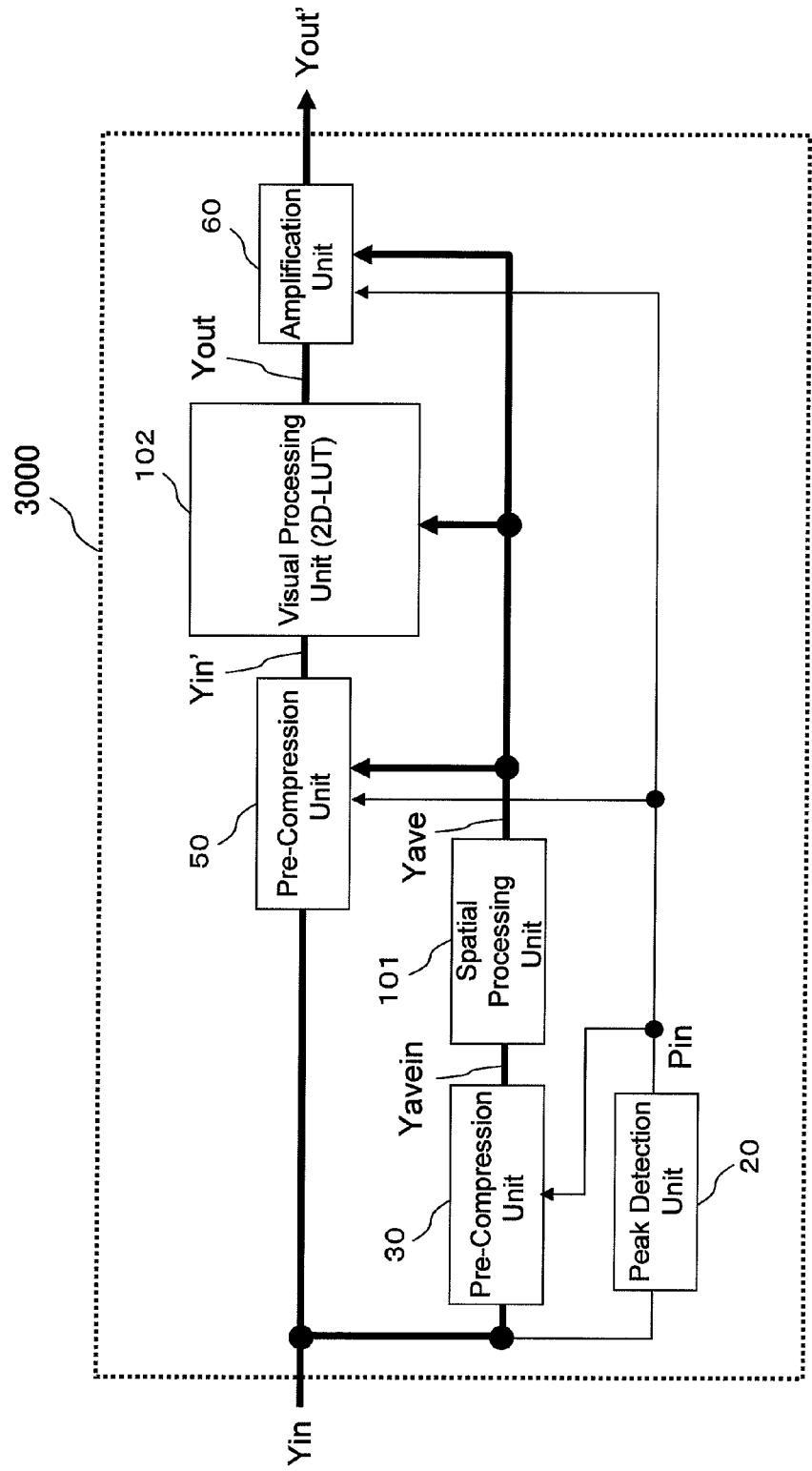
FIG. 13 is a block diagram illustrating the configuration of a D-range compression apparatus 3000 according to a third embodiment of the present invention.

FIG. 13 is a block diagram illustrating the configuration of the D-range compression apparatus 3000 according to the third embodiment of the present invention.

As shown in FIG. 13, the D-range compression apparatus 3000 according to the third embodiment of the present invention is configured in the same manner as the D-range compression apparatus 2000 according to the second embodiment, but with a pre-compression unit 30 added in the stage previous to the spatial processing unit 101. Aside from that, however, the configuration is the same as that of the D-range compression apparatus 2000 according to the second embodiment, and thus detailed descriptions will be omitted.

The pre-compression unit 30 has the same input/output characteristics as the pre-compression unit 30 of the first embodiment.

It is preferable for the pre-compression unit 50 to have a configuration that achieves the input/output characteristics (Yin–Yin' input/output characteristics) of the pre-compression unit 50 by changing the knee point Kp in the pre-compression unit 30 based on the surrounding average luminance signal Yave, as shown in FIG. 12A. For example, it is preferable to take the knee point Kp' that has been changed as:

$$Kp'=Kp*(2-Yave)/(2-Kp)$$

and achieve the processing performed by the pre-compression unit 50 in that manner.

The amplification unit 60 has the same input/output characteristics as the amplification unit 60 of the second embodiment.

Accordingly, with the D-range compression apparatus 3000 according to the third embodiment of the present invention, the D-ranges of two inputs signals of a two-dimensional LUT in the visual processing unit can be aligned by performing pre-compression processing on the input signal Yavein of the spatial processing unit 101. As a result, it is possible to organize the look-up table data of the two-dimensional LUT as a square matrix. In particular, the scale of the circuit can be reduced when achieving the D-range compression apparatus as hardware.

(Fourth Embodiment)

While the visual processing units 102 of the D-range compression apparatuses 1000 to 3000, in the first through third embodiments, respectively, are configured so as to output a post-conversion luminance (called "luminance type" hereinafter), a visual processing unit in a D-range compression apparatus 4000 according to the fourth embodiment is configured so as to output a gain with respect to the input luminance (called "gain type" hereinafter).

The advantages of the gain type configuration will be described using FIG. 16. The tone conversion characteristics stored within the visual processing unit 102 (the 2D LUT) normally undergo various types of image quality tuning in advance and thus have non-linear characteristics such as those shown in FIG. 16 (1). At this time, it is often the case that minute adjustments to dark portions (for example, the region indicated by "A" in FIG. 16; hereinafter, the region indicated by A in FIG. 16 will be referred to as a "dark region A") in particular are extremely important in terms of image quality, and in the case of low bit accuracy in the output image signal (output luminance signal Yout), the tone expression capabilities in the dark region A drop dramatically.

Figure 16:
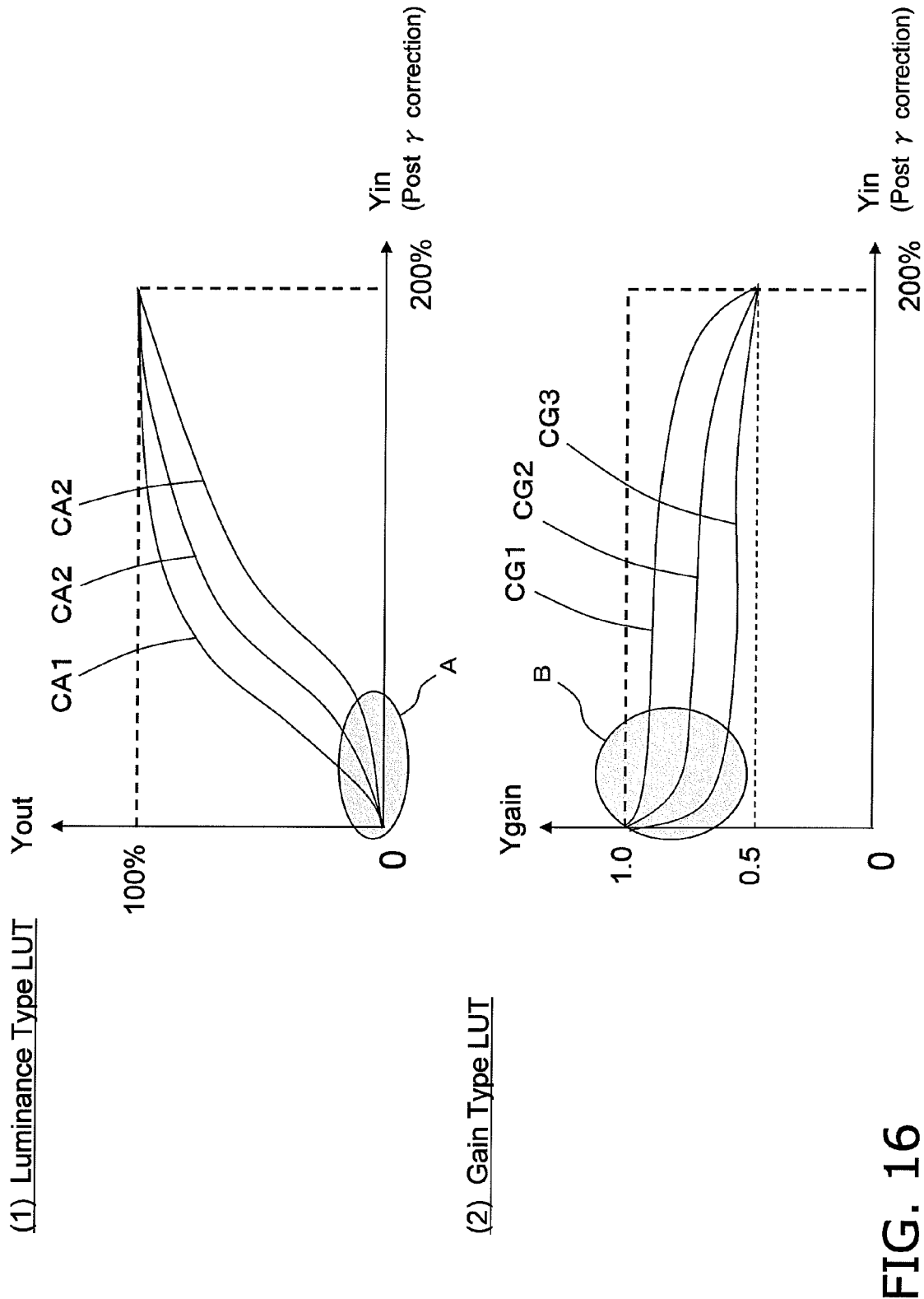
FIG. 16 is a diagram illustrating the input/output characteristics of a visual processing unit 102 (luminance type) and a visual processing unit 103 (gain type).

On the other hand, the characteristics shown in FIG. 16 (2) arise with the gain type LUT shown in FIG. 16 (2), when the same characteristics as those in the dark region A shown in FIG. 16 (1) are achieved. In other words, as shown in FIG. 16, the curves CA1, CA2, and CA3 correspond to the curves CG1, CG2, and CG3, respectively, and the same tone conversion is achieved by the characteristics shown in FIGS. 16 (1) and (2). Note that the characteristic curves shown in FIGS. 16 (1) and (2) are rough indications for illustrative purposes, and are not to be taken strictly. Furthermore, it goes without saying that the characteristic curves are not limited to those shown in FIGS. 16 (1) and (2).

As can be seen from the characteristics shown in FIG. 16, for example, the amount of change in the output gain signal relative to the amount of change in the input luminance signal of the dark region B (a region corresponding to the dark region A in FIG. 16 (1)) in FIG. 16 (2) is larger than the amount of change in the output luminance signal relative to the amount of change in the input luminance signal of the dark region A in FIG. 16 (1). For this reason, a gain type LUT can allocate more bits to dark portions, and thus can improve the tone reproduction capabilities for dark portion in an image (video) obtained by the D-range compression apparatus using a gain type LUT.

The present embodiment will now be described using FIG. 17.

Figure 17:
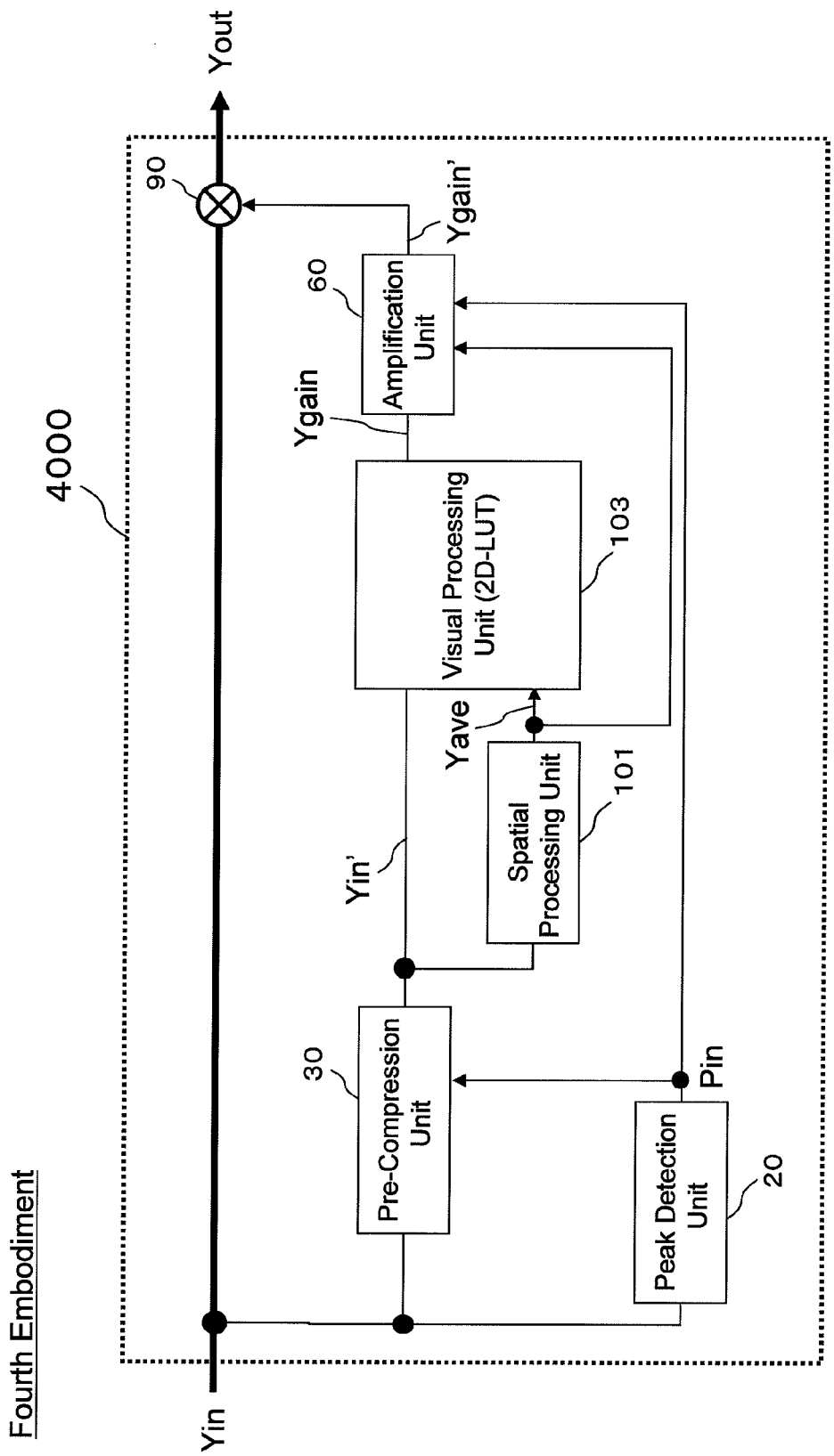
FIG. 17 is a block diagram illustrating the configuration of a D-range compression apparatus 4000 according to a fourth embodiment of the present invention.

FIG. 17 is a block diagram illustrating the configuration of the D-range compression apparatus 4000 according to the fourth embodiment of the present invention.

As shown in FIG. 17, the D-range compression apparatus 4000 according to the fourth embodiment of the present invention has the same configuration as the D-range compression apparatus 1000 according to the first embodiment, but replaces the visual processing unit 102 with a visual processing unit 103 (gain type), replaces the amplification unit 40 with an amplification unit 60, and adds a multiplication unit 90. The D-range compression apparatus 4000 of the present embodiment differs from the D-range compression apparatus 1000 of the first embodiment in such a manner. Aside from that, the D-range compression apparatus 4000 is identical to the D-range compression apparatuses 1000 and 2000 of the first and second embodiments, respectively. Furthermore, portions that are the same as those of the previous embodiments will be assigned the same reference numerals, and descriptions thereof will be omitted.

The visual processing unit 103 is configured of, for example, a gain type two-dimensional LUT, as described earlier and shown in FIG. 16 (2). This gain type two-dimensional LUT may be created through an equivalent transformation so as to have the same characteristics as the luminance type two-dimensional LUT shown in FIG. 16 (1).

The visual processing unit 103 (gain type) has a gain type two-dimensional LUT, and takes the image signal Yin' outputted by the pre-compression unit 30 and the surrounding average luminance signal Yave outputted by the spatial processing unit 101 as its inputs. The visual processing unit 103 obtains a gain Ygain from the input luminance signal Yin and the surrounding average luminance signal Yave based on the input/output characteristics (input luminance signal Yin)–(gain Ygain) as shown in FIG. 16 (2) (gain type tone conversion characteristics). The visual processing unit 103 outputs the obtained gain Ygain to the amplification unit 60.

Note that the gain type two-dimensional LUT used in the visual processing unit 103 (gain type) achieves the same characteristics as, for example, the two-dimensional LUT (luminance type) in the visual processing unit 102 of the previous embodiments. In other words, in this case, the gain Ygain obtained by the gain type two-dimensional LUT used in the visual processing unit 103 (gain type) is a gain that can be used to derive the output image signal Yout, by multiplying that gain Ygain with the image signal Yin' as per the following formula:

(output image signal Yout)=(image signal Yin')*(gain Ygain)

The amplification unit 60 is a functional unit identical to the amplification unit 60 of the D-range compression apparatus 2000 according to the second embodiment. The amplification unit 60 takes the gain Ygain outputted by the visual processing unit 103, the surrounding average luminance signal Yave outputted by the spatial processing unit 101, and the peak value Pin outputted by the peak detection unit 20 as its inputs. The amplification unit 60 obtains a gain Ygain' from the gain Ygain based on the surrounding average luminance signal Yave and the peak value Pin, and outputs the obtained gain Ygain' (a gain in which the gain Ygain has been further amplified) to the multiplication unit 90.

The multiplication unit 90 takes the image signal Yin and the gain Ygain' outputted by the amplification unit 60 as its inputs, and obtains an output image signal Yout by multiplying the gain Ygain' amplified by the amplification unit 60 with the image signal Yin. The multiplication unit 90 then outputs the obtained output image signal Yout.

As described thus far, with the D-range compression apparatus 4000 according to the present embodiment, the tone reproduction capabilities particularly for dark portions in an image (video) obtained by the D-range compression apparatus 4000 can be improved by changing the spatial processing unit to the gain type.

(Other Embodiments)

In the above embodiments, the two-dimensional LUT of the visual processing unit 102 in the D-range compression apparatus was described as a fixed LUT. However, the present invention is not limited thereto, and the two-dimensional LUT data of the visual processing unit 102 may be enabled to be switched; switching the two-dimensional LUT data makes it possible to adapt to cases where the D-range of the image signal Yin' inputted into the visual processing unit 102 is changed. An alteration made to the configuration of the D-range compression apparatus 2000 will be described as a specific example of such a configuration. Note that the configurations of the D-range compression apparatuses 1000 and 3000 can also be altered in the same way.

Figure 15:
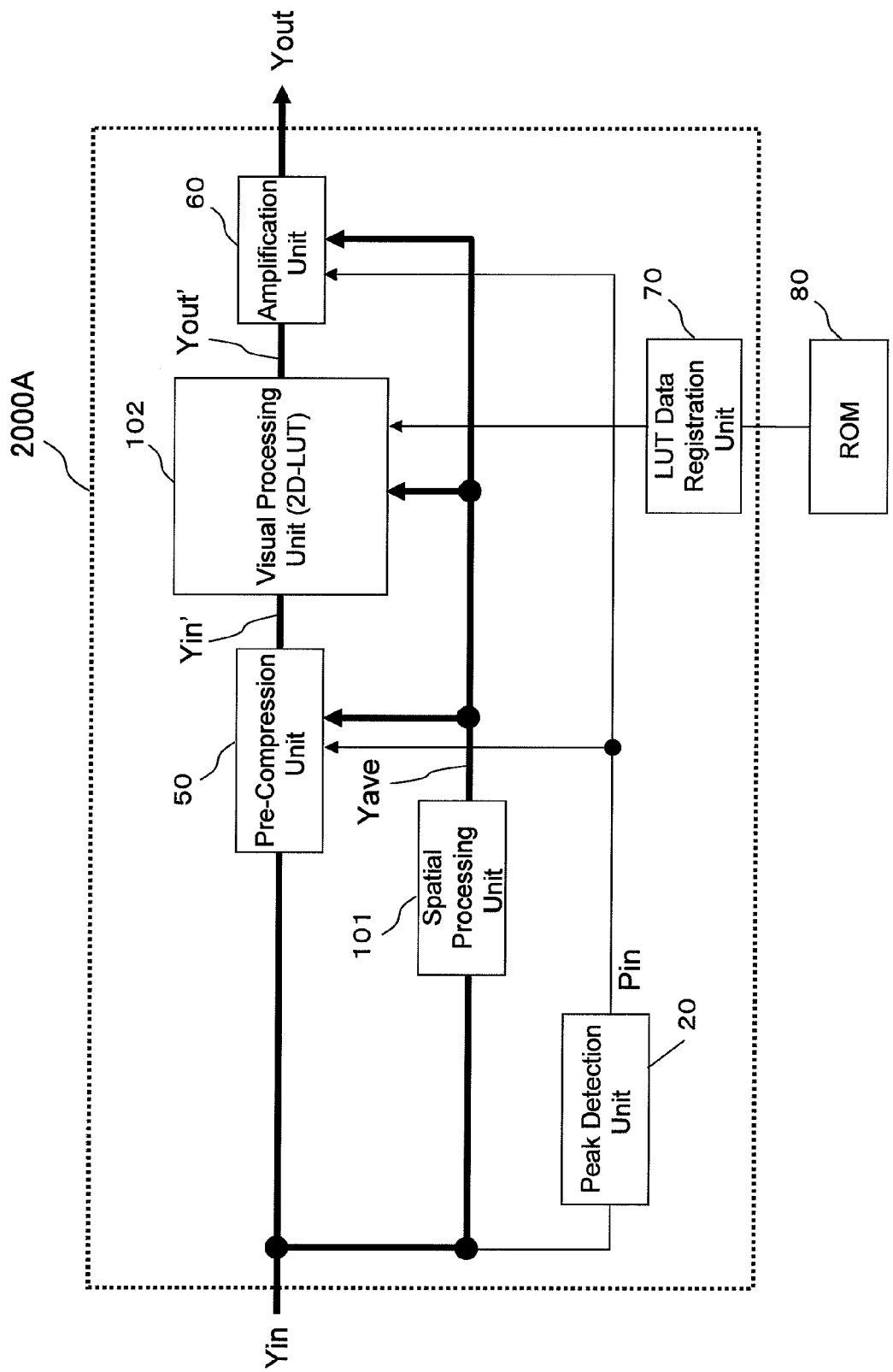
FIG. 15 is a block diagram illustrating the configuration of a D-range compression apparatus 2000A according to another embodiment of the present invention.

As shown in FIG. 15, a D-range compression apparatus 2000A has the same configuration as the D-range compression apparatus 2000, but with an LUT data registration unit 70 added thereto.

The LUT data registration unit 70 takes two-dimensional LUT data from a ROM 80 external to the D-range compression apparatus 2000A as its input, and registers the two-dimensional LUT data inputted from the ROM 80 in the two-dimensional LUT of the visual processing unit 102.

The ROM 80 stores multiple types of two-dimensional LUT data, and outputs a single arbitrary piece of that two-dimensional LUT data to the LUT data registration unit 70. For example, two-dimensional LUT data for the cases where the D-range of the image signal Yin' is 200%, 300%, 400%, 500%, and so on is stored in the ROM 80, and such two-dimensional LUT data based on the D-range of the image signal Yin' is registered in the visual processing unit 102 via the LUT data registration unit 70.

In this manner, the D-range compression apparatus 2000A is capable of registering two-dimensional LUT data based on the D-range of the image signal Yin' in the visual processing unit 102, and thus a D-range compression apparatus that offers the same effects as those described in the above embodiments can be easily achieved even when the D-range of the image signal Yin' is changed.

Although the visual processing unit 102 of the visual processing apparatus 10 described in the above embodiments is described as implementing its processing using a two-dimensional LUT, it should be noted that the invention is not limited thereto, and the processing of the visual processing unit 102 may be implemented through computations or the like. Furthermore, the configuration may be such that only the two-dimensional LUT data of representative tone conversion curves (for example, ten tone conversion curves) is held in the visual processing unit 102, and data corresponding to tone conversion curves located between the representative tone conversion curves (when the necessary number of tone conversion curves is 256, 246 (or 256−10) tone conversion curves) is obtained through interpolation processing. This makes it possible to reduce the amount of two-dimensional LUT data held in the visual processing unit 102.

Furthermore, although the above embodiments described the D-range compression apparatus 1000 as having a configuration that uses the pre-compression unit 30 and the amplification unit 40, and the D-range compression apparatus 2000 as having a configuration that uses the pre-compression unit 50 and the amplification unit 60, the present invention is not limited thereto, and the configuration may use alternate combinations of pre-compression units and amplification units. For example, a D-range compression apparatus may have a configuration that uses the pre-compression unit 30 and the amplification unit 60. Note that the D-range compression apparatus requires time to calculate the surrounding average luminance signal Yave, and therefore utilizing the pre-compression unit 30, which does not use the surrounding average luminance signal Yave, as the pre-compression unit of the D-range compression apparatus, and the amplification unit 60, which does use the surrounding average luminance signal Yave, as the amplification unit of the D-range compression apparatus, makes it possible to achieve a D-range compression apparatus that does not experience processing delay, but which also has the same basic effects as those described in the second embodiment.

The various blocks of the D-range compression apparatuses described in the above embodiments may be implemented as individual chips using semiconductor devices such as LSIs, or may be implemented as a single chip that includes some or all of the blocks.

Note that although the term "LSI" is used here, other names, such as IC, system LSI, super LSI, ultra LSI, and so on are used depending on the degree of integration.

Furthermore, the manner in which the circuit integration is achieved is not limited to LSIs, and it is also possible to use a dedicated circuit or a generic processor. It is also possible to employ a FPGA (Field Programmable Gate Array) which is programmable after the LSI has been manufactured or a reconfigurable processor in which the connections and settings of the circuit cells within the LSI can be reconfigured.

Furthermore, if other technologies that improve upon or are derived from semiconductor technology enable integration technology to replace LSIs, then naturally it is also possible to integrate the functional blocks using that technology. Biotechnology applications are one such foreseeable example.

The various processes of the above embodiments may be implemented through hardware or software. These processes may also be implemented through processes in which the software and hardware run integrated with one another. It goes without saying that it is necessary to adjust the timing at which to execute each process in the case where the imaging apparatus according to the above embodiments is implemented through hardware. For simplicity's sake, the descriptions in the above embodiments have omitted the details regarding the adjustment of the timing of the various signals that arises in the actual hardware architecture.

It should be noted that the specific configuration of the present invention is not intended to be limited to the above embodiments in any way, and various modifications and variations can be made without deviating from the essential spirit of the invention.

The dynamic range compression apparatus, dynamic range compression method, program, integrated circuit, and imaging apparatus of the present invention dynamically compresses an image signal so that the peak input value is compressed to the full output range, even when image signals with variable dynamic ranges are inputted, and is thus useful in fields related to video/image processing devices, and can be applied in such fields.

What is claimed is:

1. A dynamic range (D-range) compression apparatus into which is inputted an image signal having a variable D-range, the apparatus comprising:
    a spatial processing unit operable to calculate a surrounding average luminance signal for the image signal;
    a visual processing unit operable to perform D-range compression processing so that the variable D-range of the image signal falls within a predetermined output D-range by converting the image signal based on tone conversion characteristics determined in accordance with the surrounding average luminance signal;
    a peak detection unit operable to detect a peak value within an image formed by the image signal; and
    an amplification unit operable to perform dynamic amplification processing in accordance with the peak value so that the variable D-range of the image signal outputted by the visual processing unit becomes the predetermined output D-range by converting the image signal outputted by the visual processing unit based on amplification input/output conversion characteristics determined based on the peak value.

2. The D-range compression apparatus according to claim 1, wherein the predetermined output D-range is approximately 90% to 100% in a case where a maximum value according to an image format is 100%.

3. The D-range compression apparatus according to claim 1, further comprising:
    a pre-compression unit operable to perform dynamic compression processing in accordance with the peak value so that the variable D-range of the image signal falls within the maximum input D-range of the visual processing unit by converting the image signal based on compression input/output conversion characteristics determined based on the peak value,
    wherein the visual processing unit performs the D-range compression processing so that the D-range of the image signal outputted by the pre-compression unit falls within the predetermined output D-range by converting the image signal outputted by the pre-compression unit based on tone conversion characteristics determined in accordance with the surrounding average luminance signal.

4. The D-range compression apparatus according to claim 1,
    wherein the amplification unit performs the dynamic amplification processing in accordance with the peak value, further using the surrounding average luminance signal.

5. The D-range compression apparatus according to claim 3,
    wherein the pre-compression unit performs the dynamic compression processing in accordance with the peak value, further using the surrounding average luminance signal.

6. The D-range compression apparatus according to claim 4,
    wherein the amplification unit performs the dynamic amplification processing based on the amplification input/output conversion characteristics that output a higher value the lower the peak value is.

7. The D-range compression apparatus according to claim 4,
wherein the amplification unit performs the dynamic amplification processing based on the amplification input/output conversion characteristics that output a higher value the higher the surrounding average luminance signal is.

8. The D-range compression apparatus according to claim 6,
wherein the amplification unit achieves the amplification input/output conversion characteristics by multiplying the gain of broken line characteristics calculated from the peak value and the surrounding average luminance signal.

9. The D-range compression apparatus according to claim 6,
wherein the amplification unit achieves the amplification input/output conversion characteristics using broken line characteristics.

10. The D-range compression apparatus according to claim 4,
wherein, assuming the surrounding average luminance signal is Yave, the peak value is Pin, the output value of the visual processing unit with respect to the peak value Pin is Pout, the value of a knee point is Kp, the image signal inputted to the amplification unit is Yout, the image signal outputted from the amplification unit is Yout', and the point of maximum whiteness determined by the image format is 100%, expressed as "1", the amplification unit performs the dynamic amplification processing by finding the image signal Yout' outputted by the amplification unit using the following formulas:

$$k4(Pout)=(1/Pout-1)/(Pout-Kp)$$

$$g2(Yave, Pin)=k4(Pout)*\max(Yave-Kp, 0)+1$$

$$Yout'=g2(Yave, Pin)*Yout.$$

11. The D-range compression apparatus according to claim 5,
wherein the pre-compression unit performs the dynamic compression processing based on the compression input/output conversion characteristics that output a lower value the higher the peak value is.

12. The D-range compression apparatus according to claim 5,
wherein the pre-compression unit performs the dynamic compression processing based on the compression input/output conversion characteristics that output a lower value the higher the surrounding average luminance signal is.

13. The D-range compression apparatus according to claim 11,
wherein the pre-compression unit achieves the compression input/output conversion characteristics by multiplying the gain of broken line characteristics calculated from the peak value and the surrounding average luminance signal.

14. The D-range compression apparatus according to claim 11,
wherein the pre-compression unit achieves the compression input/output conversion characteristics using broken line characteristics.

15. The D-range compression apparatus according to claim 5,
wherein, assuming the surrounding average luminance signal is Yave, the peak value is Pin, the value of a knee point is Kp, the image signal inputted to the pre-compression unit is Yin, the image signal outputted from the pre-compression unit is Yin', and the point of maximum whiteness determined by the image format is 100%, expressed as "1", the pre-compression unit performs the dynamic compression processing by finding the image signal Yin' outputted by the pre-compression unit using the following formulas:

$$k3(Pin)=(2/Pin-1)/(Pin-Kp)$$

$$g1(Yave, Pin)=k3(Pin)*\max(Yave-Kp, 0)+1$$

$$Yin'=g1(Yave, Pin)*Yin.$$

16. The D-range compression apparatus according to claim 1,
wherein the visual processing unit outputs a lower value the higher the surrounding average luminance signal is.

17. The D-range compression apparatus according to claim 1,
wherein the visual processing unit has a two-dimensional LUT that achieves the tone conversion characteristics, and performs the D-range compression processing using the two-dimensional LUT.

18. The D-range compression apparatus according to claim 17 further comprising:
an LUT data registration unit operable to register data of the two-dimensional LUT of the visual processing unit.

19. The D-range compression apparatus according to claim 3,
wherein the spatial processing unit calculates the surrounding average luminance signal based on a signal outputted by the pre-compression unit.

20. The D-range compression apparatus according to claim 1, further comprising:
a gain multiplication unit operable to multiply the image signal with a gain,
wherein the visual processing unit outputs a first gain, the first gain being a gain for performing the D-range compression processing so that the D-range of the image signal falls within the predetermined output D-range by converting the image signal based on the tone conversion characteristics determined in accordance with the surrounding average luminance signal;
the amplification unit outputs a second gain obtained by amplifying the first gain; and
the gain multiplication unit multiplies the image signal with the second gain.

21. The D-range compression apparatus according to claim 1,
wherein the visual processing unit is configured of a two-dimensional look-up table that takes the image signal and the surrounding average luminance signal as an input of the visual processing unit.

22. A dynamic range (D-range) compression method that uses an image signal having a variable D-range as an input of a visual processing unit, the method comprising the steps of:
calculating a surrounding average luminance signal for the image signal;
performing D-range compression processing so that the variable D-range of the image signal falls within a predetermined output D-range by converting the image signal based on tone conversion characteristics determined in accordance with the surrounding average luminance signal;

detecting a peak value within an image formed by the image signal; and performing dynamic amplification processing in accordance with the peak value so that the variable D-range of the image signal outputted in the step of performing the D-range compression processing becomes the predetermined output D-range by converting the image signal outputted in the step of performing D-range compression processing based on amplification input/output conversion characteristics determined based on the peak value.

23. A non-transitory computer-readable recording medium in which is recoded a program that causes a computer to execute a dynamic range (D-range) compression processing that uses an image signal having a variable D-range as its input, the program causing the computer to:

calculate a surrounding average luminance signal for the image signal;

perform the D-range compression processing so that the variable D-range of the image signal falls within a predetermined output D-range by converting the image signal based on tone conversion characteristics determined in accordance with the surrounding average luminance signal;

detect a peak value within an image formed by the image signal; and perform dynamic amplification processing in accordance with the peak value so that the variable D-range of the image signal outputted in the performing D-range compression processing becomes the predetermined output D-range by converting the image signal outputted in the performing D-range compression processing based on amplification input/output conversion characteristics determined based on the peak value.

24. An integrated circuit used in a dynamic range (D-range) compression apparatus into which is inputted an image signal having a variable D-range, the integrated circuit comprising:

a spatial processing unit operable to calculate a surrounding average luminance signal for the image signal;

a visual processing unit operable to perform D-range compression processing so that the variable D-range of the image signal falls within a predetermined output D-range by converting the image signal based on tone conversion characteristics determined in accordance with the surrounding average luminance signal;

a peak detection unit operable to detect a peak value within an image formed by the image signal; and an amplification unit operable to perform a dynamic amplification processing in accordance with the peak value so that the variable D-range of the image signal outputted by the visual processing unit becomes the predetermined output D-range by converting the image signal outputted by the visual processing unit based on amplification input/output conversion characteristics determined based on the peak value.

25. An imaging apparatus provided with a dynamic range (D-range) compression apparatus into which is inputted an image signal having a variable D-range, the imaging apparatus comprising:

a spatial processing unit operable to calculate a surrounding average luminance signal for the image signal;

a visual processing unit operable to perform D-range compression processing so that the variable D-range of the image signal falls within a predetermined output D-range by converting the image signal based on tone conversion characteristics determined in accordance with the surrounding average luminance signal;

a peak detection unit operable to detect a peak value within an image formed by the image signal; and an amplification unit operable to perform a dynamic amplification processing in accordance with the peak value so that the variable D-range of the image signal outputted by the visual processing unit becomes the predetermined output D-range by converting the image signal outputted by the visual processing unit based on amplification input/output conversion characteristics determined based on a peak value.

* * * * *